May 4, 1943.　　　　W. E. MATHI　　　　2,318,241
CALCULATING MACHINE
Filed Sept. 12, 1941　　　13 Sheets-Sheet 1

INVENTOR
WALTER E. MATHI
BY
Naylor and Lasagne
ATTORNEYS

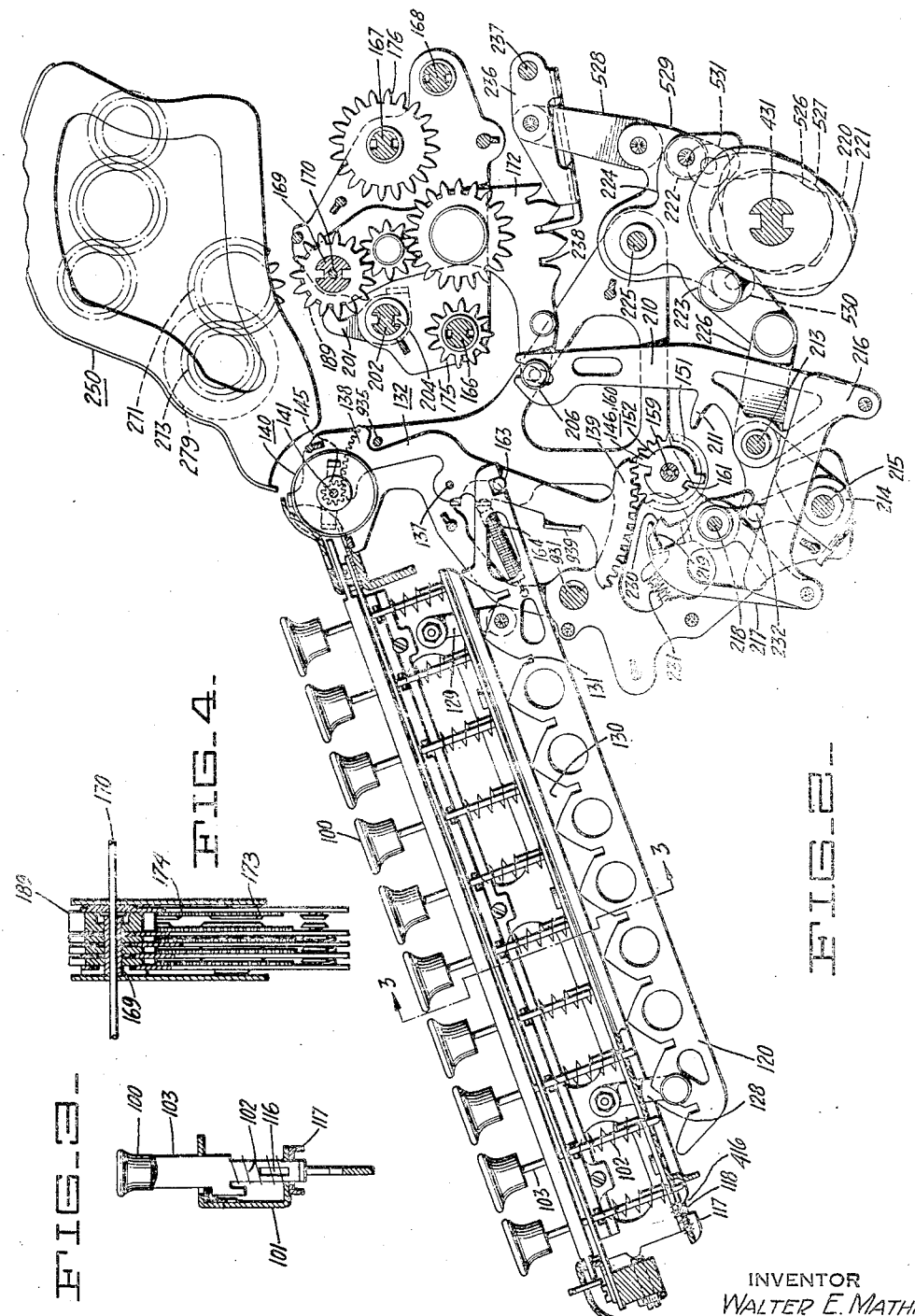

May 4, 1943.　　　　　W. E. MATHI　　　　　2,318,241
CALCULATING MACHINE
Filed Sept. 12, 1941　　　　13 Sheets-Sheet 3

INVENTOR
WALTER E. MATHI
BY
ATTORNEYS

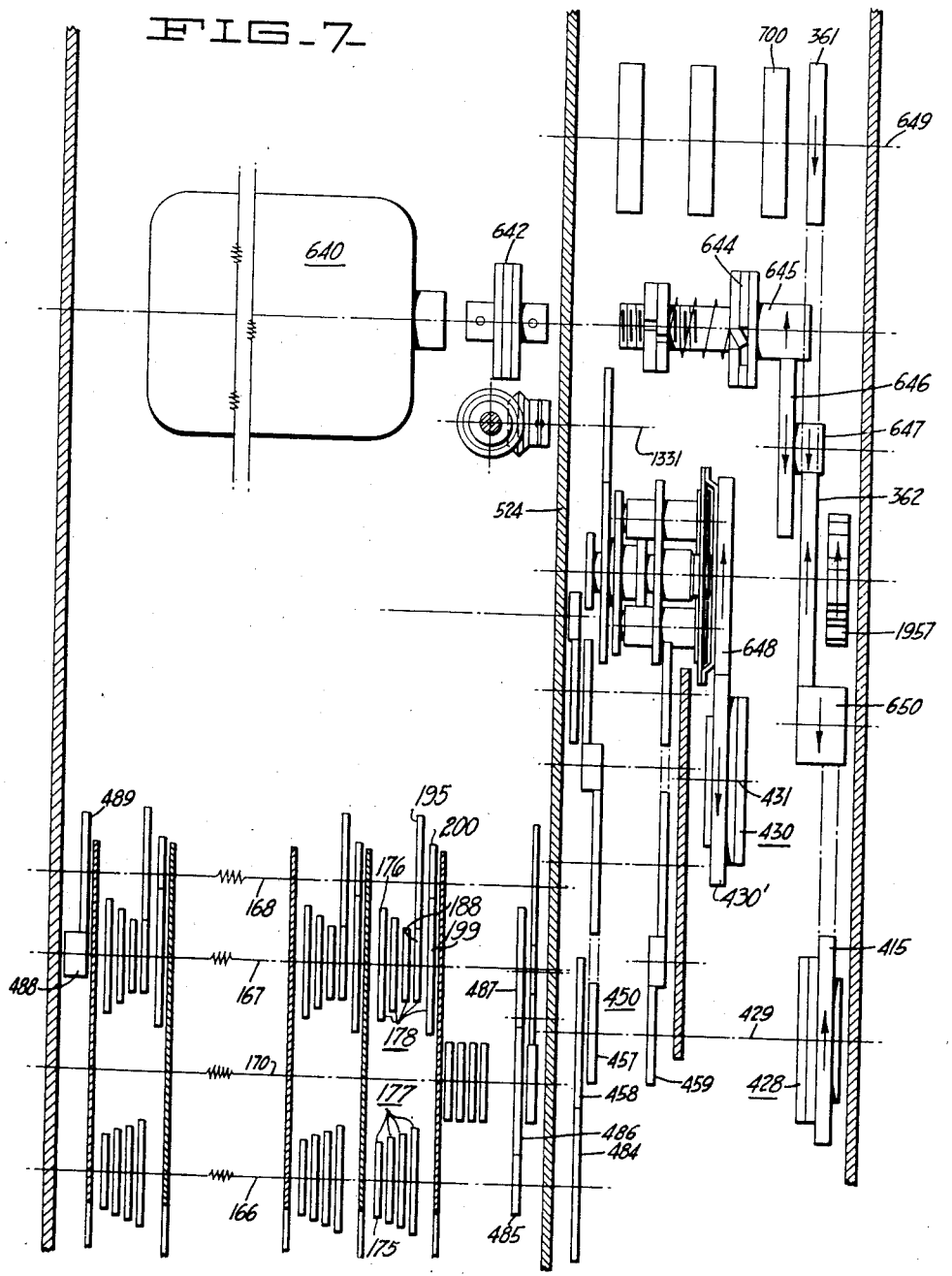

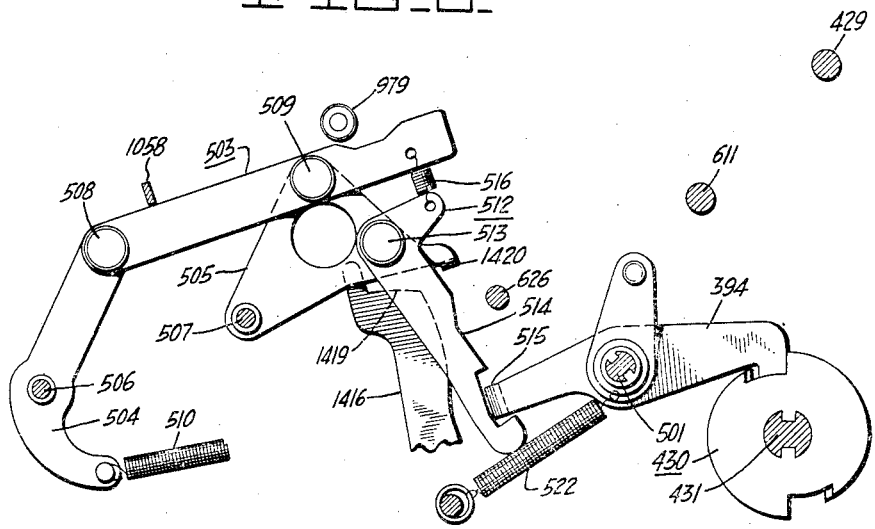
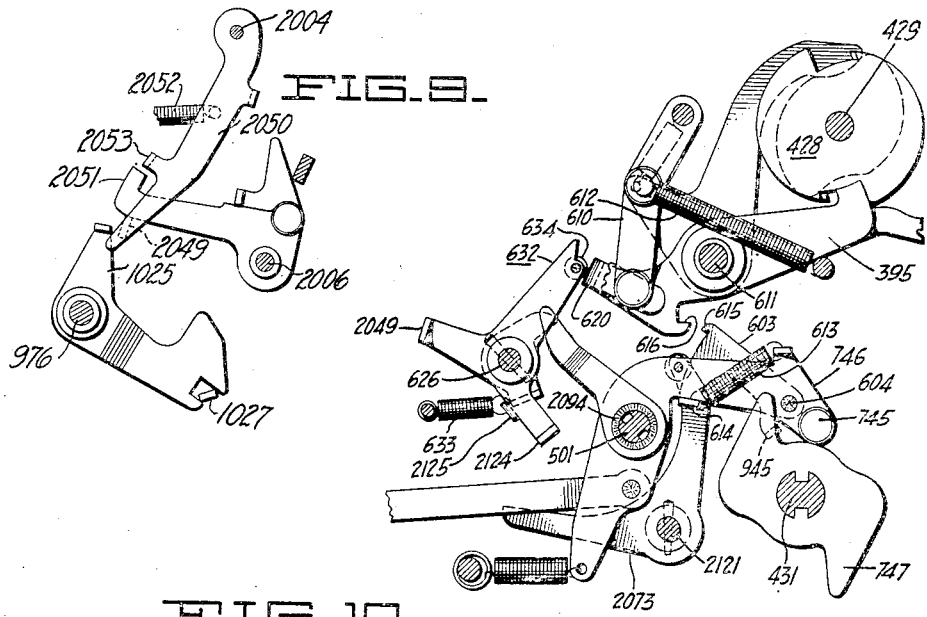

May 4, 1943.  W. E. MATHI  2,318,241
CALCULATING MACHINE
Filed Sept. 12, 1941  13 Sheets-Sheet 6
FIG_11_
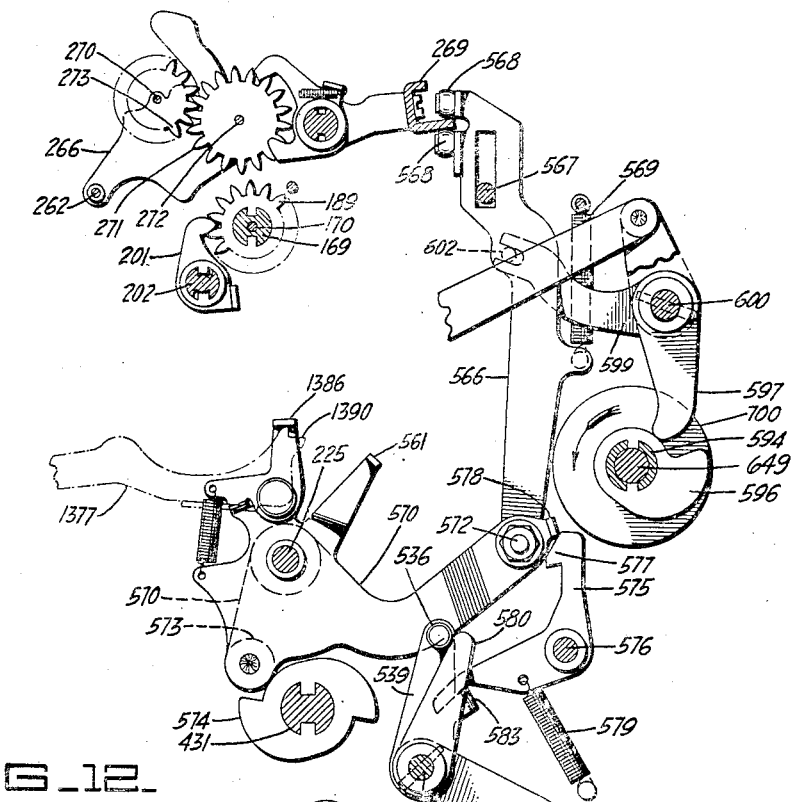
FIG_12_
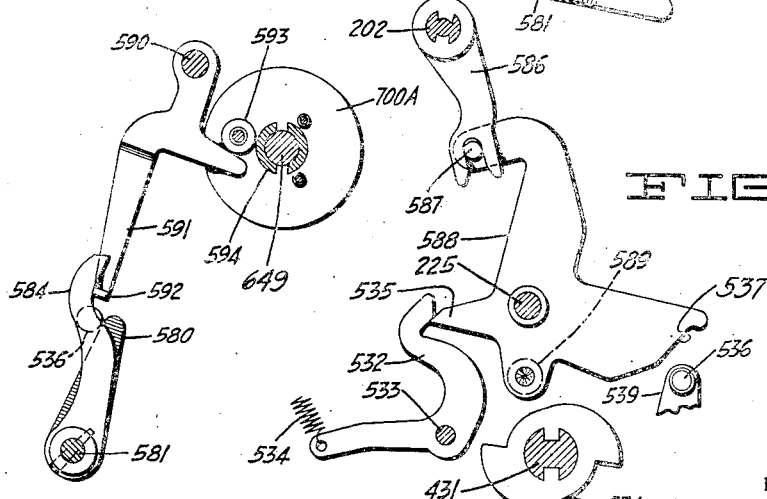
FIG_13_
INVENTOR
WALTER E. MATHI
BY
*Naylor and Lassagne*
ATTORNEYS May 4, 1943.  W. E. MATHI  2,318,241
CALCULATING MACHINE
Filed Sept. 12, 1941    13 Sheets-Sheet 7
FIG_14_
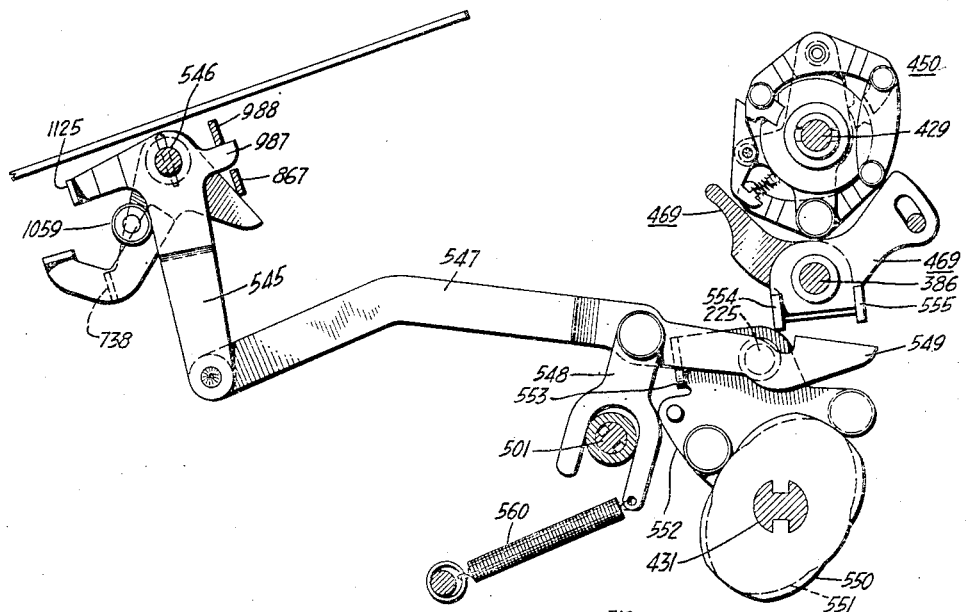
FIG_15_
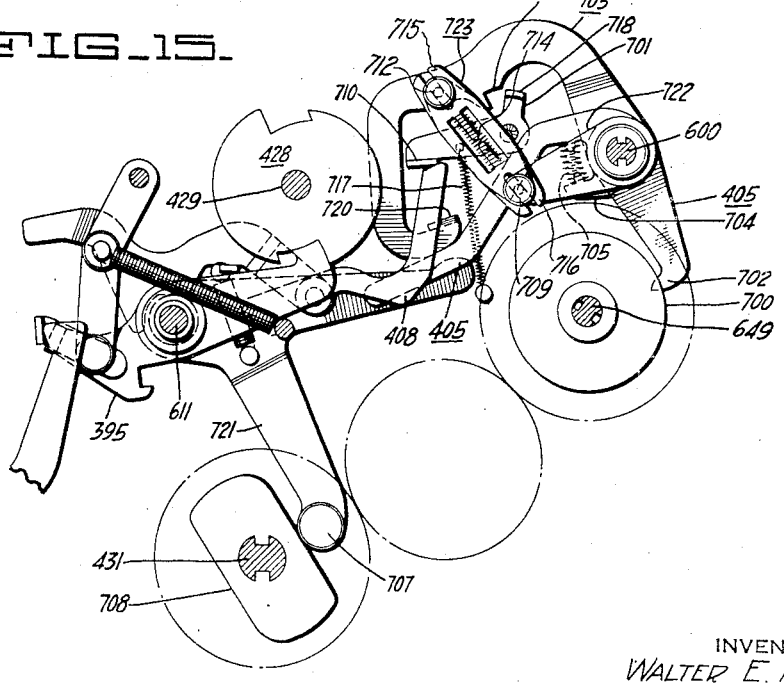
INVENTOR
WALTER E. MATHI
BY
ATTORNEYS

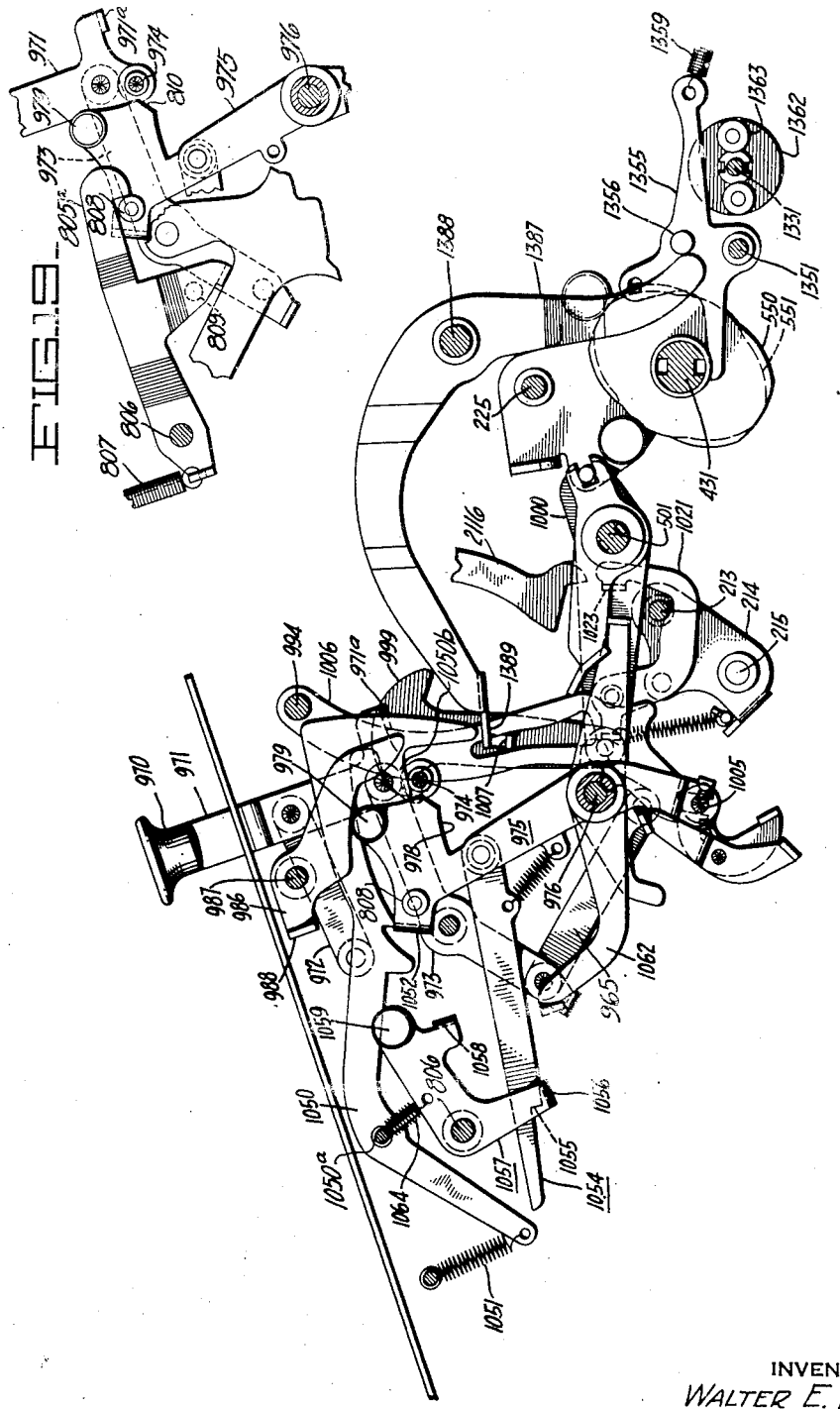

May 4, 1943.  W. E. MATHI  2,318,241
CALCULATING MACHINE
Filed Sept. 12, 1941          13 Sheets-Sheet 10
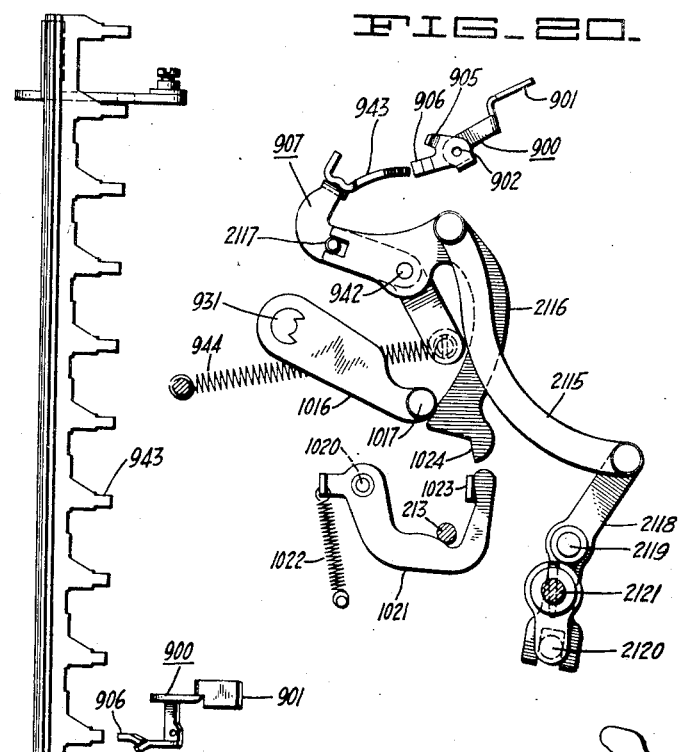
FIG_20.
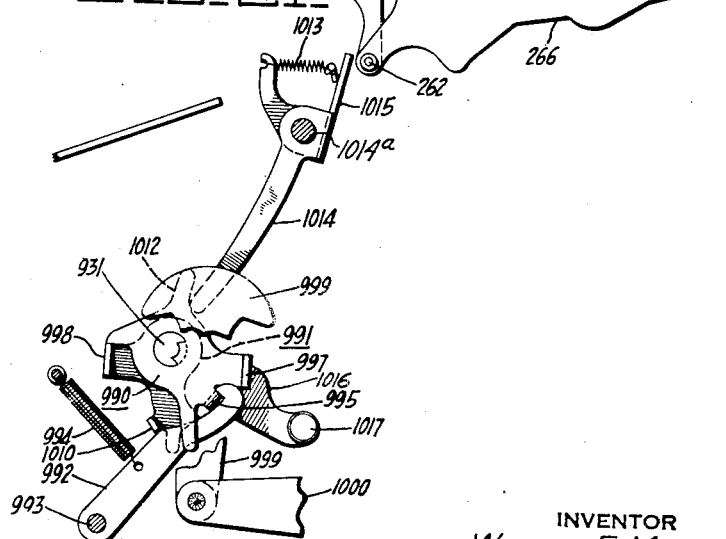
FIG_21.
FIG_22.
INVENTOR
WALTER E. MATHI
BY
ATTORNEYS May 4, 1943. W. E. MATHI 2,318,241
CALCULATING MACHINE
Filed Sept. 12, 1941 13 Sheets-Sheet 11
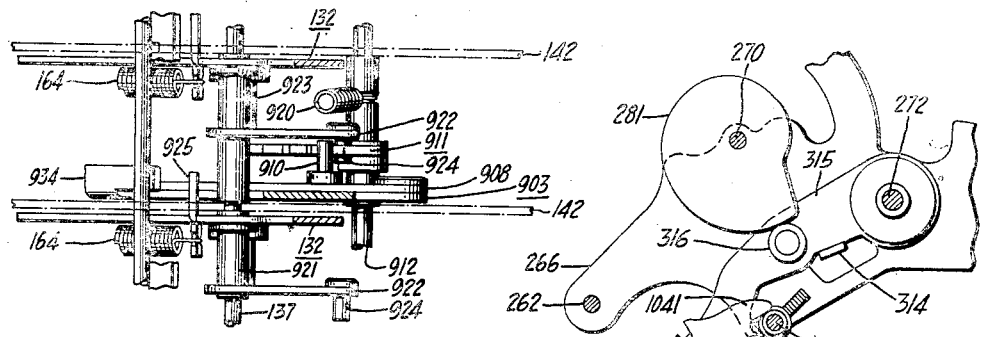
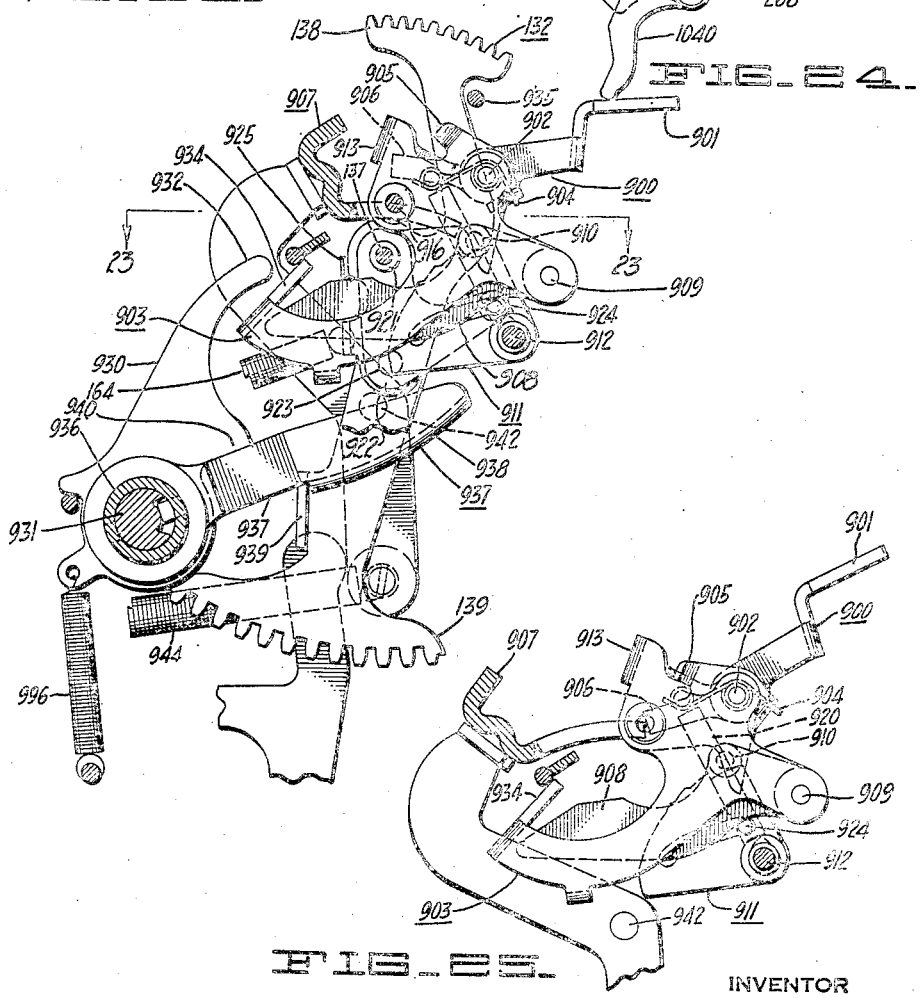
INVENTOR
WALTER E. MATHI
BY
ATTORNEYS

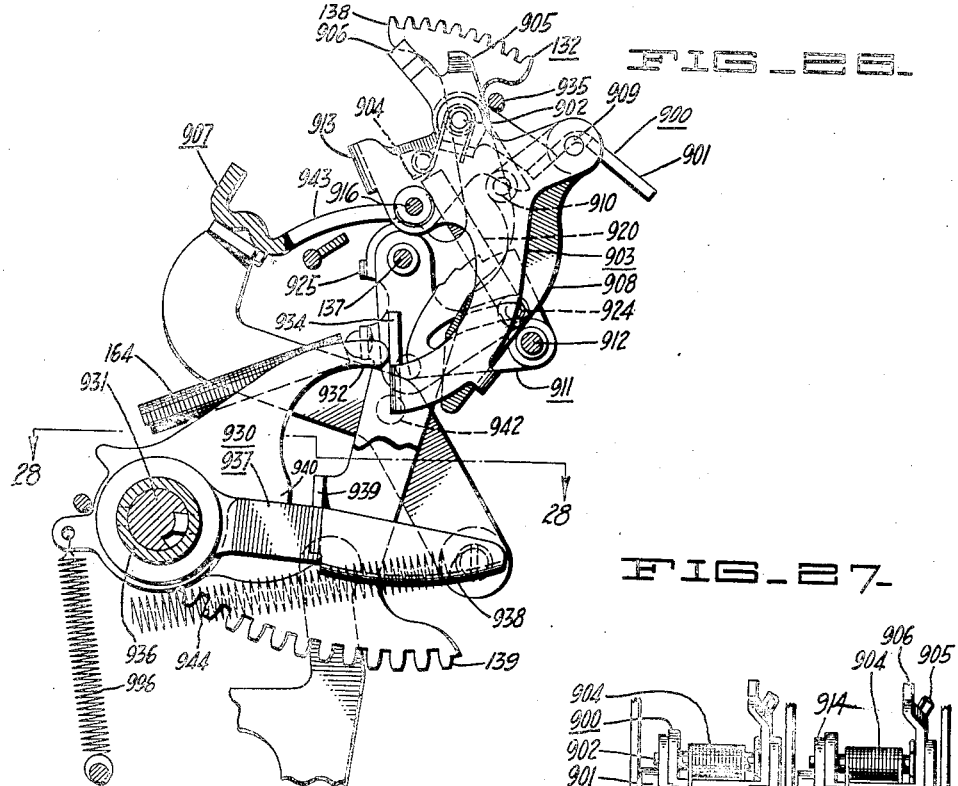
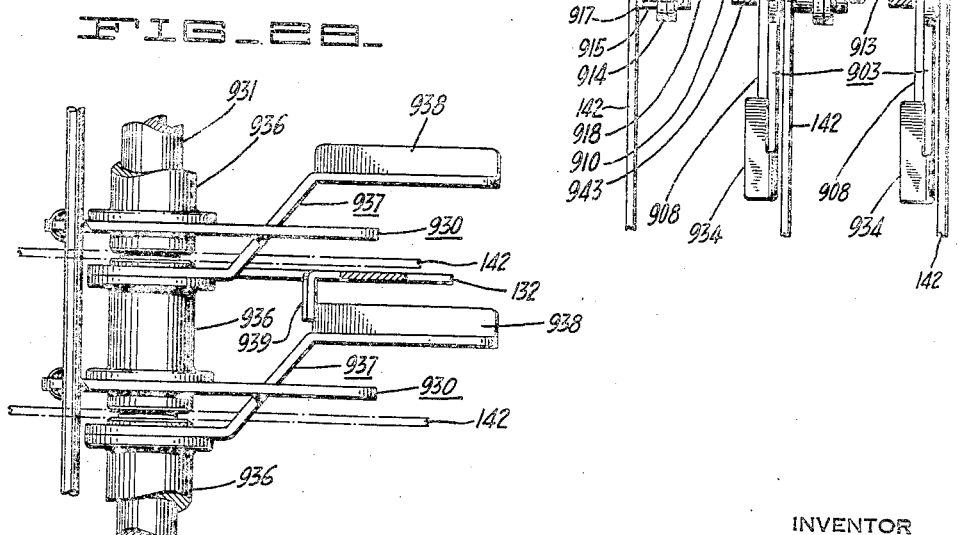

May 4, 1943.    W. E. MATHI    2,318,241
CALCULATING MACHINE
Filed Sept. 12, 1941    13 Sheets-Sheet 13

INVENTOR
WALTER E. MATHI
BY
ATTORNEYS

Patented May 4, 1943

2,318,241

UNITED STATES PATENT OFFICE 2,318,241

CALCULATING MACHINE

Walter E. Mathi, Oakland, Calif., assignor to Marchant Calculating Machine Company, a corporation of California Application September 12, 1941, Serial No. 410,558

9 Claims. (Cl. 235—62)

This invention relates to calculating machines of the type capable of performing division calculations and has particular reference to mechanism for arresting operation of a calculating machine during a division calculation.

One object of the present invention is to provide improved means for stopping a calculating machine during division, selectively either permitting the completion of a division operation in a current order and the determination of the true quotient digit therein, or immediately stopping the machine.

A further object of the invention is to simplify the construction and operation of a division control mechanism of the character described.

The invention is illustrated as applied to calculating machines constructed in accordance with the disclosure of the Harold T. Avery Patent Number 2,216,659, issued October first, 1940, to which reference is hereby made for a disclosure of a complete calculating machine, including mechanisms not specifically disclosed herein. It is to be understood, however, that the invention may also be applied to other calculating machines capable of performing division calculations or the like.

The manner in which the above and other objects of the invention are accomplished will be readily understood on reference to the following specification when read in conjunction with the accompanying drawings wherein:

Figure 2 is a sectional elevational view, illustrating the manually set selection mechanism, the power set selection mechanism, and a portion of the actuator mechanism.

Figure 3 is a section taken along the line 3—3 of Figure 2, illustrating the typical construction and mounting of a key.

Figure 4 is a sectional view through the five selection plates in one of the decimal orders.

Figure 7 is a schematic view showing the various units and their relation to the driving means.

Figure 8 is a side elevational view of the mechanism for controlling the setting clutch.

Figure 9 is a side elevational view of the mechanism for limiting operation of the main clutch to a single cycle.

Figure 10 is a side elevational view of the mechanism for controlling operation of the main clutch.

Figure 11 is a side elevational view illustrating the mechanism for raising and lowering the dipping portion of the carriage.

Figure 12 is a side view of mechanism utilized to control movement of the dipping portion of the carriage.

Figure 13 is a side view of the mechanism for releasing the actuator pawls at the start of a machine operation.

Figure 14 is a side elevational view of the reverse unit and controls therefor.

Figure 15 is a side elevational view of the restore clutch and controls therefor.

Figure 18 is a side elevational view showing part of the division control mechanism.

Figure 19 is a detail view illustrating the means for tripping the division control lever.

Figure 20 is a side elevational view illustrating the means controlled by the division sensing mechanism.

Figure 21 is a side elevational view of the mechanism for operating the shaft which controls the enabling and disabling of the division sensing mechanism.

Figure 22 is a plan view of the division control gate and one of the division sensing levers associated therewith.

Fig. 23 is a plan view in section illustrating a portion of the division control mechanism, particularly the means for transmitting from a lower order of the sensing and control mechanism to the next higher order, the decimal value of a value set in the lower order, and is taken substantially along the line 23—23 of Figure 24.

Figure 24 is a side elevational view illustrating the division sensing mechanism and its relation to the accumulating mechanism.

Figure 25 is a detail view of certain of the elements of Figure 24, showing them in an alternate position in which the sensing levers are effective to block the division control gate.

Figure 26 is a view similar to Figure 24 showing a sensing lever blocked out of operative position.

Figure 27 is a plan view, illustrating two of the division sensing units.

Figure 28 is a sectional plan view of the division control mechanism, and is taken on the line 28—28 of Figure 26.

Figure 1:
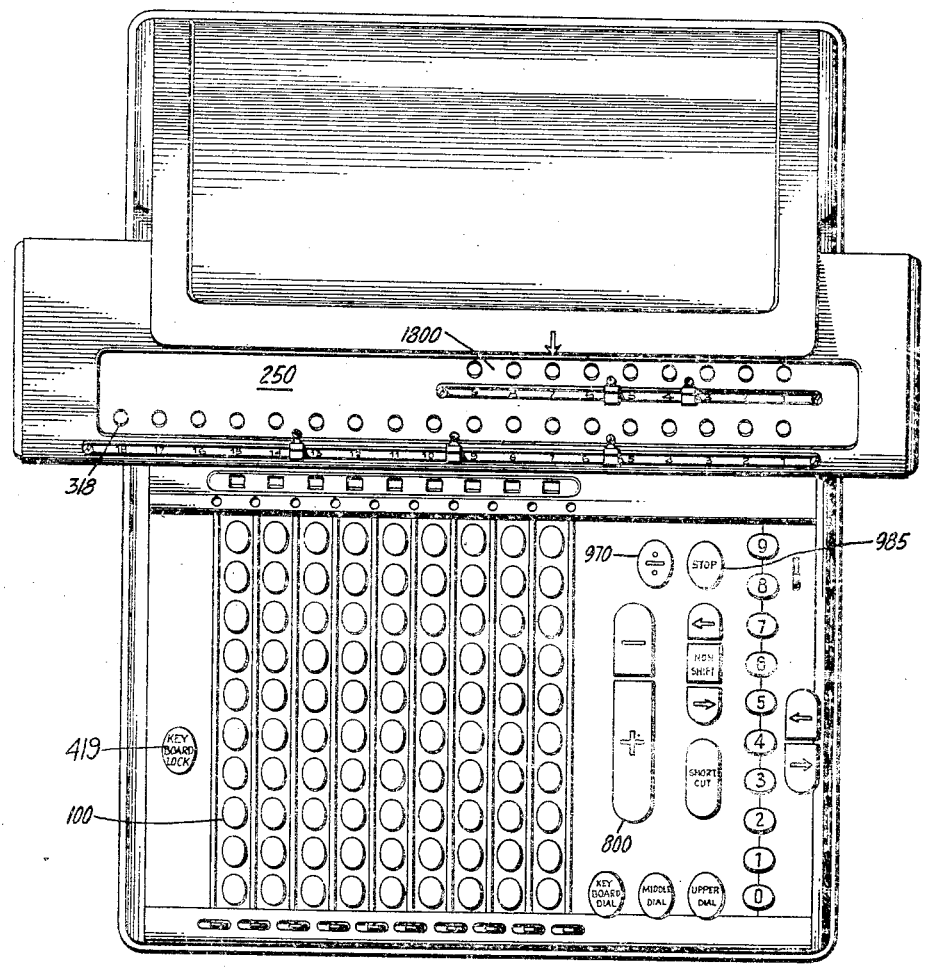
Figure 1 is a plan view of the machine in which the present invention is incorporated.

The machine to which the present invention is applied utilizes the well known "tear down" method of division calculation, wherein the divisor is subtracted as many times as possible from the dividend to obtain the quotient. The first quotient digit is derived by subtracting the divisor as many times as possible from the highest series of denominational orders of the dividend in which the divisor is contained, the second quotient digit by subtracting the divisor from the highest remaining series of orders in which it is contained, and so on.

This method of determining the quotient is generally carried out by setting up the dividend in a series of dials in an accumulator register mounted on a shiftable carriage, while setting up the divisor in a series of keys on a keyboard. The carriage is usually so positioned relative to the various keys depressed on the keyboard, or vice versa, that on beginning the multiple subtraction process, the divisor will be subtracted from the highest series of register dial orders into which such divisor can be contained, thereby deriving the first quotient digit which appears on a suitable counter. Thereafter, the carriage is shifted one order to the left, which has the same effect as multiplying the remainder by ten, and the same procedure of deriving the next lower order quotient digit is followed through.

It is ofen desirable to stop the machine before the quotient digit in the last order of the counter is reached, while at the same time obtaining true quotient digits in those orders in which the division has been completed.

Again, it is often desirable to stop the machine before the end of the division operation in a certain carriage position, as for example, if the division operation has accidentally been initiated with a set up in the accumulator register dials and none in the keyboard. In this case, the machine will ordinarily continue to operate indefinitely because no subtraction will actually take place.

Another example of a case in which it would be desirable to stop the machine before obtaining the true quotient digit in a given carriage position would be a case in which the division operation was initiated with the carriage positioned too far to the left, as for example, if the accumulator register and keyboard relation were such that a single digit would have to be subtracted a large number of times from a three or four or larger order number before obtaining the first quotient digit.

The present invention provides a single depressible key which, when depressed part way through its full stroke to a position wherein it encounters a yieldable limit stop, will cause the machine to stop when a true quotient digit has been obtained in the actuated order of the counter, and which, when depressed to the limit of its full stroke against the urge of its yieldable limit stop, will arrest the machine immediately, and possibly before such "digit completion" is effected in the actuated order.

*Manually set selection mechanism*

The machine in connection with which the present invention is illustrated is of the key-set type in which means are provided for first setting one factor of the calculation upon a keyboard and subsequently effecting operation of the machine by manipulation of a separate control key or bar.

The mechanism for setting up the first factor of a calculation, such as a dividend, may be considered as comprising a manually operated portion and a power operated portion, the manually operated portion being designed to be moved to a selected controlling position by the depression of value keys on the keyboard, and the power operated portion being designed to be brought into operation immediately before operation of the calculating mechanism and to act under control of the manually set selection mechanism to move elements of the calculating mechanism into the proper position to cause operation of such calculating mechanism to enter the values which are set up on the keyboard into the accumulator register.

The various value selecting keys 100 (Figures 1 and 2) of the keyboard are arranged in a series of banks, each bank including progressively arranged keys ranging from zero to nine in value, and, as disclosed in detail in the above Avery Patent Number 2,216,659, each key 100 is slidable vertically in a channel frame 101 (Figure 3). Compression springs 102 are provided to normally maintain the keys 100 in their illustrated raised positions. All of the key stems 103 of the value keys are of the same length and each has a cam extrusion 116 which, upon depression of the associated key, pushes to the right, as viewed in Figure 2, a slotted key locking slide 117, slidably supported on the under side of the channel frame 101, thereby releasing any other latched down key in the same section. Upon full depression of any value key, the slide 117 is returned to its initial location under the urge of a spring 118, and by overlapping the upper end of the extrusion 116 on the depressed key stem, latches the depressed key.

Disposed beneath the value keys 100 in each bank is a differentially settable bar 120 which is pivotally suspended from the associated channel frame 101 by means of two parallel links 128 and 129. This bar 120 has nine identical divergent notches 130 therein, each of which terminates in a rectangular slot 131 proportioned to receive the end of the associated key stem 103 so that the bar 120 will be accurately positioned. The key stems 103 are spaced equal distances apart, and these distances are slightly greater than the spacing between the successive slots 131 so that each succeeding slot 131 will be spaced one increment further away from the cooperating key stem. Thus depression of a value key will cam the bar 120 to the right a number of increments equal to the value represented by the depressed key.

Such movement of the bars 120 is utilized to set up a mechanical representation of the selected value to control the actuating mechanism accordingly, and for this purpose segment members 132 are connected by means of pin and slot connections 163 to respective ones of the bars 120 and are pivotally mounted on a rod 137 extending across the machine. Each of the segment members 132 is provided at opposite ends thereof with arcuate racks 138 and 139 which serve to transmit the movement of the associated differential bar 128, respectively, to a pinion 145 of a check dial assembly 140 rotatably mounted on a rod 141, and to a gear 151 of a cam unit 146 which is rotatably mounted on a rod 159 and which is positioned by such movement to form a mechanical representation of the value set up on the respective key bank.

Each cam unit 146 comprises a gear 151 and five cams integrally connected thereto, one of which is shown at 152. Each of the cams has two high points 160 and two low points 161 on its periphery. The cams are so staggered that no high or low point on one cam is aligned with a high or low point on another cam.

As is described in detail in the above mentioned Avery patent, the various cams on each cam unit 146 are so arranged that upon depression of an associated value key 100, the gear 151 of the same order will be driven by the arcuate rack 139 to rotate the cam unit 146 to a position wherein one of the high points of one only of the cams will be positioned in the path of a nose 211 of one of a set of five feeler arms 210 on one side of the cam unit 146, or in the path of a nose 219 of one of a set of five feeler arms 217 on the opposite side of the cam unit 146.

*Power set selection mechanism*

Upon depression of one of the calculation control keys, such as a division key 970 (Figures 1, 16, and 18) or an add key 800 (Figure 1), a setting clutch 430 (Figures 7 and 8) is engaged to rotate one-half revolution, as will be more fully described hereinafter, to likewise rotate a setting shaft 431. Keyed on the setting shaft 431 are a number of pairs of complementary cams identical to cams 220 and 221 (Figure 2), and each pair has an associated cam follower 224 pivoted on a cross rod 225 and provided with a roller 222 in engagement with the cam 220 and a second roller 223 in engagement with the cam 221. As the shaft 431 rotates in a counter-clockwise direction, the cam followers 224 are rocked and, through links 226, impart a counter-clockwise rocking movement to a series of levers 214 pivoted on a shaft 215 extending across the machine.

A shaft 213, supported by the levers 214, has pivotally mounted thereon the groups of feeler arms 210, hereinbefore described, one of these groups being located adjacent each of the cam units 146. During the leftward movement of the levers 214, and consequently of the shaft 213, the feeler arms 210 are moved by the shaft 213 until each of the noses 211 engages the periphery of the respective cam in the cam unit 146, thereby causing each feeler arm 210 to pivot about the point of contact between its respective nose and the periphery of its associated cam. The balance of the forward movement of the shaft 213 by the cam followers 224 effects forward movement of the lower ends of the feeler arms 210, and this movement is transmitted through links 216 to feeler arms 217 aligned with the associated feeler arms 210. The arms 217 are then rocked in a clockwise direction about a fixed shaft 218 until their noses 219 engage the peripheries of the respective cams at points substantially diametrically opposite that engaged by the noses 211 of the associated feeler arms 210.

To accurately position each cam unit 146 during the power sensing operation, a pawl 230 (Figure 2) in each order is mounted on the shaft 218 and is urged by a spring 231 against a pin 232 on one of the links 214. During the portion of the setting clutch operation in which the levers 214 are rocked counter-clockwise, the pin 232 releases the pawl 230 enabling the same to be engaged between adjacent teeth on the gear 151 by its spring 231 and thereby holds the cam unit 146 from displacement during the power sensing operation.

As was mentioned hereinbefore, each of the cam units 146 is so arranged that only one of the associated pairs of feeler arms 210 and 217 of any group will have their respective noses in engagement with the high or low point of a cam at any one value setting of the respective key section. Thus, one of the feeler arms 210 will be rocked a considerable angle about its supporting shaft 213 to one side or the other of a medial position, depending upon whether its nose 211 is in engagement with a high point 160 or a low point 161 of its respective cam. All of the other feeler arms will, since their noses are held in engagement with the concentric peripheral portions of their cams, be held in medial positions with their upper ends located substantially in the position illustrated in Figure 2.

Each of the feeler arms 210 is connected through a pin and slot connection 206 with one of a series of five plates 172 pivotally suspended from a sleeve 169 (Figures 2 and 4) which is rotatable on a stationary rod 170, there being one of such series of plates for each order of the machine. Pivotally mounted on each plate 172 is a set of entrained gears 173 and 174, the latter meshing with a laminated gear 189 keyed to the sleeve 169.

*Actuator mechanism*

From the above it will be seen, that depending on the selection made, four of each group of five of the selection plates 172 will be held in medial positions similar to that indicated in Figure 2, while the fifth will be moved forward or rearward until the lowermost gear 173 thereon meshes with an aligned gear, indicated at 175, on an actuator shaft 166, or with an aligned gear, indicated at 176, on an actuator shaft 167 (see also Figure 7).

Gear 175 is one of the group 177 of four gears keyed on the actuator shaft 166 and adapted to mesh with the lowermost gears 173 on the four leftmost selection plates 172 in each order. Likewise, gear 176 forms one of a group 178 of five gears mounted on the shaft 167 and adapted to mesh with the gears 173 on the five selection plates. The three leftmost gears of this latter group are keyed to the shaft 167 while the two rightmost gears 188 and 199 are free on the shaft 167 and mesh with gears 195 and 200, respectively, keyed on a third actuator shaft 168.

The shafts 166, 167, and 168 are connected to a cyclically operable main clutch 428 (Figures 7, 10, and 15) in a manner to be described presently, so that the shaft 166 rotates through 180° for each cycle (one-half revolution) of operation of the clutch 428, and the shaft 167 rotates through 90° for each cycle, while the shaft 168 rotates through 30° for each cycle of the main clutch. The diameters of the various gears in the two gear groups 177 and 178 are so arranged that for each main clutch cycle, the laminated gear 189 (Figures 2 and 4) will be rotated by one of the gears of the groups 177 and 178, a number of increments corresponding to the value of the associated key 100, if such has been depressed. If no key has been depressed, the selection plates 172 will be so arranged that none of the gears in either of the groups 177 and 178 will become operative to drive the selection plate gears 173.

Means are provided for locking the selection plates 172 in any of their three operative positions throughout a machine performance and comprises a locking bail 236 (Figure 2) extending across the machine and pivotally supported on a rod 237, the bail being adapted to be moved into engagement with one of three notches 238 formed on each of the selection plates 172, after a selection has been made. The bail 236 is connected through link 528 to a cam follower 529 pivoted on the rod 225 and having rollers 530 and 531 thereon in engagement with complementary cams 526 and 527, respectively, keyed on the setting shaft 431 so that operation of the setting clutch will effect locking of the selection plates 172 after the feeler arms 210 and 217 have been rocked to effect a power selection.

Accumulator mechanism

From the foregoing description of the selection and actuator mechanisms, it is apparent that a number comprising a plurality of figures can be registered upon the various sleeves 169 (Figure 2) by differentially driving the gears 189 attached thereto various proportionate distances. However, in order to perform any mathematical computation mechanism must be provided for advancing a superior registering element one extra increment whenever the next lower registering element has completed registration of ten digits in a machine operating according to the decimal system.

Figure 5:
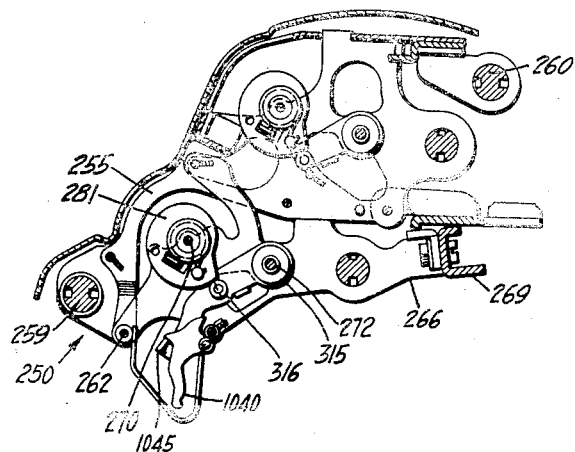
Figure 5 is a transverse sectional view, taken through the carriage, illustrating the snail cams which are driven by the accumulator dials, and the follower means operable thereby.

In the present machine this function is accomplished by accumulator mechanism having indicia bearing dials 279 (Figure 2) visible through sight openings 318 (Figure 1) and carried in a carriage 250. The carriage is supported for endwise movement by shafts 259 and 260 (Figure 5) which slide through bearings (not shown) supported by the stationary portion of the machine.

Carriage shifting mechanism (not shown) of the type disclosed in detail in the above Avery Patent 2,216,659 is preferably provided to shift the carriage step by step into any of a plurality of different positions.

The accumulator mechanism employed in the present machine is also disclosed in detail in the above Avery Patent 2,216,659 and, therefore, it is believed that a brief description of the same and the driving connections thereof will be sufficient for an understanding of the present invention.

The accumulator mechanism comprises in part, a shaft 262 supported by spaced carriage brace plates 255, which shaft serves as a pivotal support for a plurality of plates 266, ordinarily spaced from each other, and all connected to a common bail 269. The bail 269 is known as a "dipping bail" by means of which the entire body of plates 266 can be simultaneously rocked about the shaft 262 during performance of a calculation such as division.

The various denominational registering units of the accumulator mechanism are supported by the rockable plates 266, each unit forming an assembly between two of these plates. Each unit comprises a dial 279 (Figure 2) connected by differential planetary mechanism (not shown) to both a corresponding gear 273 and to the next lower order dial 279 whereby both digitation and tens carry can be effected concurrently. The gear 273 is rotatably mounted on a rod 270 (Figure 11) supported by the plates 266 and meshes continuously with a second gear 271 rotatably mounted on a rod 272 also supported by the plates 266.

As the dipping bail 269 is lowered during a setting clutch operation, as will be described hereinafter, the gears 271 are lowered into mesh with the aligned laminated gears 189 on the sleeves 169 to enable digitational entry to be made into the accumulator.

General calculations drive

Power for effecting operation of the various mechanisms of the machine, including the setting clutch 430 and the main clutch 428, is derived from a motor 640 (Figure 7), the armature shaft of which is connected through a coupling 642 and a suitable safety slip clutch 644 to a pinion 645 entrained with a gear train including gears 646, 647, 362, 650, and 415, the latter being mounted on the driven side of the main clutch 428. When the main clutch is engaged, power is transmitted thereby through a reverse unit generally indicated at 450 (to be described hereinafter) to the above mentioned actuator shafts 166 and 167 through a gear train including gears 458, 484, 485, 486, and 487. The shaft 168 is driven by the shaft 167 through gears 488 and 489.

The setting clutch 430 has a gear 430' mounted on the driven side thereof which meshes with a gear 648 suitably coupled to the motor driven gear 362. The gear 362 also drives a gear 361 fastened on a rotatable shaft 649 on which is also mounted a restore clutch 700 to be described hereinafter.

Setting clutch

The present machine employs a cyclically operable setting clutch and mechanism operable thereby to effect various operations incident to the commencement of a calculation under the power of the motor. The details of this clutch are disclosed in the aforesaid Avery Patent Number 2,216,659.

Operation of the setting clutch 430 (Figures 7 and 8) is under the control of the machine operator, particularly through the instrumentality of various operation control keys. The control of the clutch 430 is such that, immediately upon depression of one of the operation control keys, a clutch dog 394 is rocked away from the clutch to enable engagement of the clutch and to start the motor so as to drive the setting shaft 431. Normally, however, the clutch dog 394, which is keyed on a rockable shaft 501 is held in engagement with the clutch by a spring 522 tensioned between the clutch dog and a frame stud, and when in such position, holds the setting clutch out of engagement.

To permit operation of the setting clutch by the control mechanism hereinafter described, an operating bar 503 is provided which is supported by a parallel link arrangement comprising levers 504 and 505 pivotally supported at 506 and 507, respectively, and connected to the bar 503 at 508 and 509, respectively. The bar 503 is normally held in its illustrated raised position by a tension spring 510 extending between the lower end of the lever 504 and a frame stud (not shown).

To enable lowering of the bar 503 to rock the clutch dog 394 out of engagement with the setting clutch 430, a bell crank 512 is pivoted to the lever 505 at 513 and is provided with a notched arm 514, the notch of which embraces a lateral extension 515 on the dog 394. When the bell crank is in the position in which it is normally held by a spring 516, tensioned between the other end of the bell crank and the control bar 503, it is capable of rocking the clutch dog 394 upon depression of the bar 503. Means (not shown) are, however, provided to rock the bell crank 512 from engagement with the dog 394 during the first setting clutch cycle, to limit operation of clutch 430 to a single cycle (one-half revolution) since this is all that is required to operate all of the mechanism to be actuated by the clutch in conditioning the machine for operation.

In addition to operating the power set selection and locking mechanism, as previously described, the setting clutch causes dipping of the accumulator mechanism to mesh the gears 271 (Figures 2 and 11) with the laminated actuating gears 189, initiation of operation of the main clutch, and conditioning of the reverse unit control mechanism for operation, as will appear hereinafter.

Dipping of accumulator

As was previously mentioned, the accumulator mechanism carried by the carriage 250 is dipped by the setting clutch at the start of a machine operation to mesh the gears 271 (Figures 2 and 11) with the actuating gears 189 to effect transfer of values to the accumulator, this being accomplished by lowering the bail 269 and supporting plates 266 about the pivot rod 262.

The means for dipping the bail 269 at the start of a calculation and for thereafter elevating the same to its illustrated raised position at the completion of a calculation comprises two vertically slidable links, one of which is shown at 566 (Figure 11), guide over pins 567 and provided with rollers 568 engaging the top and bottom surfaces of one leg of the bail 269. The links 566 are urged upwardly by springs 569 tensioned between the links and frame studs. The links are pivoted to cam followers 570 at 572, which cam followers carry rollers 573 held in engagement with cams 574 keyed on the setting shaft 431 so that the links 566 are positively pulled down upon operation of the setting clutch.

Means are provided for latching the accumulator mechanism and links 566 in their lowermost positions throughout a calculation performance. This means includes latch levers 575 in the form of bell cranks pivoted at 576 and each having a nose 577 formed at the upper end thereof to engage ear 578 on the respective cam follower 570. The latch levers 575 are urged counterclockwise into engagement with the ears 578 by springs 579 tensioned between the levers 575 and frame studs so that when the links 566 are dipped, the ears 578 ride past the noses 577 and are latched therebeneath, thus holding the links depressed until the latch levers 575 are released as will appear presently.

Pawls 201 (Figures 2 and 11), which are normally held in pawling relation with the gears 189 when the machine is not operating, are released in time with the dipping of the accumulator so that release of the gears 189 is properly coordinated with the meshing of gears 271 therewith. The pawls 201 are loosely keyed to a shaft 202 to which are fixed arms 586 (Figure 13), connected by pin and slot connections 587 to levers 588 pivoted on the rod 225 and provided with rollers 589 adapted to be engaged by certain of the cams 574. When the setting shaft 431 rotates, the cams 574 rock the levers 588 and the pawls 201 in those orders in which a value is to be entered are thus released. A detent mechanism, such as the conventional one illustrated in Figure 13, is provided, which comprises a lever 532 pivoted on a shaft 533 and urged clockwise by a spring 534, such movement thereof being limited by a stop (not shown). The lever 532 cooperates with a nose 535 formed on the lever 588 to retain it in either of the positions in which it is capable of being set, so that the pawls 201 will not reengage the gears 189 until the restore clutch operates as will be described hereinafter.

Means are provided for releasing the dipping carriage latch levers 575 at the conclusion of a calculation so as to enable the accumulator to be again raised to its upper illustrated position by the springs 569 to permit shifting of the carriage, clearance of the accumulator, et cetera. These include levers 580 and 584 (Figure 12) secured to a rockable shaft 581, the latter lever engaging an ear 592 on a lever 591 pivoted at 590. The lever 591 has an extension thereon lying in the path of rotation of a roller 593 eccentrically mounted on a disc 700A which is driven by the restore clutch 700 (Figures 7, 11, 15, and 16) when the same is engaged as an incident to completion of a calculation, as will be described hereinafter.

Upon rotation of the disc 700A in a counterclockwise direction the roller 593 rocks the lever 591 clockwise, thereby rocking levers 580 and 584. Lever 580 abuts a roller 536 on a lever 539 (Figure 11) having an extension 583 underlying one of the latch levers 575. The lever 539 is also suitably connected to another similar lever having a like extension underlying the other of the latch levers 575 so that when the shaft 581 is rocked by lever 584 the latch levers are concurrently released from restraining engagement with the cam followers 570.

As a further incident to the rocking movement of the shaft 581 during release of the latch levers 575, the roller 536 engages a cam surface 537 (Figure 13) on the lower edge of the rocking lever 588 thereby rocking this lever to cause reengagement of the pawls 201 with the gears 189.

Also rotatable by the restore clutch 700 is a cam 596 (Figure 11) which is employed to prevent the link 566 from rising too rapidly under the action of springs 569 when the cam followers 570 are released by the latch levers 575. A lever 597 fixed to a rockable shaft 600 engages the cam 596 while levers 599 also fixed to the shaft 600 are joined by pin and slot connections 602 to the links 566 so that the rate of rise of the links 566 will be governed by rotation of the cam 596.

Main clutch operation

The main clutch 428 (Figures 7, 10, and 15) is engaged and its operation initiated by the setting clutch. Thus, when any one of the operation control keys is depressed, and the setting clutch is started in operation, as has been previously described, the main clutch is automatically engaged to drive the actuator mechanism and may be held engaged for one or more cycles of operation, depending upon the type of calculation being performed.

The main clutch structure has been described in detail in the above mentioned Avery Patent 2,216,659 and is similar to that of the setting clutch, being mounted on a shaft 429 (Figure 10) and controlled by a clutch dog 395 pivotally mounted on a shaft 611 and urged into engagement with the main clutch by a spring 612 tensioned between a frame stud and a toggle linkage 610 connected to the left end of the dog. The arrangement is such that when the clutch dog 395 is held in engagement with the clutch as illustrated, the clutch is disengaged. However, when the dog 395 is rocked clockwise from its seated position, the main clutch becomes engaged to drive the actuator mechanism.

The means for causing engagement of the main clutch comprises a lever 746 (Figure 10) fulcrumed on the shaft 501 and provided with a roller 745 spring pressed into engagement with a cam 747 keyed on the setting clutch shaft 431. A member 603 is pivoted on the lever 746 at 604 and is urged clockwise with respect to the lever 746 by a spring 613 tensioned between an ear on the lever 746 and an ear 614 on the member 603, the latter forming a limit stop which engages the lower edge of the lever 746. The member 603 is provided with a nose 615 adapted to engage a notch 616 in the main clutch dog 395. Therefore, as the cam 747 is rotated during the setting clutch cycle, the member 603 engages and rocks the main clutch dog 395 out of engagement with the main clutch 428 while continued rotation of the cam 747 enables the rocking lever 746 to return to the position shown in Figure 10, so as to permit the clutch dog 395 to contact with and stop the clutch when it is free to do so.

To provide for continuous multicyclic operation of the main clutch, as occurs during division calculations, a latch 632 is provided, being pinned to a rockable shaft 626 and urged clockwise by a spring 633 tensioned between the latch and a frame stud. A roller 634 is mounted at the upper end of the latch 632 in a position to be latched under a lateral projection 620 on the tail of the main clutch dog 395. When the clutch dog 395 is rocked clockwise from the position illustrated in Figure 10 and the latch 632 is permitted to be rocked by the spring 633, the roller 634 will engage the under surface of the extension 620 on the clutch dog, permitting multicyclic operation of the main clutch.

*Main reverse unit*

Means are provided for reversing the direction of drive of the actuator mechanism by the main clutch, and this means comprises the hereinbefore mentioned reverse unit 450 (Figures 7 and 14), the construction of which is described in detail in the above mentioned Avery Patent 2,216,659.

The setting of the reverse unit is controlled by the various calculation control mechanisms, such as the division control mechanism, but it is actually set by cam means actuated by the setting clutch.

A pendular lever 545, forming a control member for the reverse unit, is pinned on a rockable shaft 546 and is pivotally connected to a bar 547 which is supported intermediate its end by a link 548 having a bifurcated end thereof guided over a sleeve fitted on the setting clutch dog shaft 501. A spring 560 tensioned between the link 548 and a frame stud normally holds the bar 547 to the right in its illustrated "positive drive" position with an upturned end 549 thereon located directly under a lug 555 on a reverse control member 469 pivoted on a shaft 386.

Upon operation of the setting clutch, with the bar 547 in its rightmost illustrated position, the bar is rocked upward to set the reverse unit in its illustrated position. This is accomplished by complementary cams 550 and 551 mounted on the setting shaft 431 and engaged by rollers carried by a cam follower plate 552. As the setting shaft is rotated, the cams 550 and 551 rock the plate 552, first clockwise, at which time an ear 553 on the plate and underlying the bar 547, raises the bar to engage the upturned end 549 with the lug 555 and thus rocks the reverse control lever 469 to the position illustrated in Figure 14 if it is not already in that position. When so set, the control lever 469 controls the reverse unit to drive the actuator mechanism in its positive direction.

However, when the pendular lever 545 is rocked clockwise from its illustrated position against the urge of spring 560 the upturned end 549 of the bar 547 will be positioned under the lug 554 of the reverse control member 469 and, therefore, during the succeeding setting clutch cycle, the member 469 will be rocked clockwise from the position shown in Figure 7 to set the reverse unit to drive the actuator mechanism in a subtractive direction.

*Restore clutch*

The restore clutch 700 (Figures 7, 11, 15, and 16) is employed to effect release of the accumulator latching levers 575 (Figure 11), as previously described; to control the rate of return of the accumulator from its dipped position; and to perform certain functions hereinafter described in connection with division operations. This clutch is controlled jointly by the dipping of the accumulator and by the operation of the main clutch dog 395 in such a way that whenever the accumulator is in its lower position and the main clutch dog 395 is seated home in a notch in the main clutch, the restore clutch will be engaged.

The restore clutch is of the cyclically operable type similar to that disclosed in the patent to Friden Number 1,643,710, issued September twenty-seventh, 1927, and a clutch release dog 405 is provided to normally hold the clutch disengaged.

The lowering of the accumulator, by rocking the shaft 600 (Figures 11 and 15) counter-clockwise, creates a spring bias tending to move the clutch release dog 405 away from the restore clutch to permit engagement thereof, but as this dog is normally latched by a member 701, the spring is prevented from becoming effective until completion of the main clutch operation. Raising of the accumulator, as described hereinbefore, is initiated and controlled by the restore clutch, and this movement is utilized to reverse the spring bias on the restore clutch release dog so as to tend to return it home so that, as the restore clutch cycle is finished, the clutch release dog is spring pressed into the full cycle notch formed in the clutch housing, bringing the restore clutch to rest at the completion of one cycle of operation thereof.

The restore clutch is mounted upon and driven by a shaft 649 (Figures 7 and 15) having a gear 361 fixed thereto and meshing with the power driven gear 362.

The clutch release dog 405 is in the form of a bell crank freely supported on the shaft 600 and has a nose 702 thereon adapted to engage in a notch formed in the housing of the restore clutch 700 to effect disengagement of the clutch. For controlling the clutch release dog 405 an M-shaped member 703 is provided which has one foot rockably mounted on the shaft 600, and a lug 704 thereon supports a compression spring 705 compressed between itself and the left arm of the clutch dog 405.

An arm 722, keyed on the shaft 600, and thus rocked by dipping movement of the accumulator, is resiliently connected to the M-shaped member 703 by a link unit generally indicated at 723. This unit comprises a pair of links 715 and 716 lying side by side, the former being pivoted on a pin 709 on the arm 722, and having an elongated slot on the opposite end thereof embracing a pin 712 on the member 703, while the link 716 is pivoted on the pin 712 and has an elongated slot embracing the pin 709. Each link has a cut out portion into which two tenons extend forming a retainer for a compression spring 714 which embraces the tenons of both links. Thus, the spring 714 will tend to retain the link unit extended in the position illustrated in Figure 15 and will be compressed if the unit is lengthened or shortened.

As the setting clutch rotates, the main clutch dog 395 is withdrawn from contact with the main clutch and an extension 408 on the dog is withdrawn from beneath an ear 710 of the latch 701 which is pivoted on a frame plate, thus permitting the latch to be rocked counter-clockwise by a spring 717 tensioned between the latch and a frame stud. An ear 718 on the latch is thus brought into engagement with a notch 719 formed on the member 703 to prevent counter-clockwise movement thereof until the main clutch has been disengaged by reseating of its dog 395 in one of the full cycle notches of the main clutch 428.

The lowering of the accumulator, however, tends to engage the restore clutch even before the main clutch engages, and a second restraining means is provided to prevent such operation. The left foot of member 703 is provided with a shelf 720 overlying one end of a bell crank 721 which is rockably supported on the shaft 611. The other end of the bell crank 721 is provided with a roller 707 engaging the periphery of a cam 708 keyed on the setting shaft 431. On rotation of the setting clutch, therefore, the bell crank 721 is rocked and the shelf 720 is raised by the end of the bell crank to rock the M-shaped member 703 slightly clockwise about the shaft 600. This raising of the member 703 not only insures that the lug 718 of the latch 701 will properly engage in the notch 719 when the main clutch is engaged, but also provides for the situation occurring in certain division operations, when operation of the setting clutch does not cause engagement of the main clutch. In this situation, the latch member 701 is not permitted to rock and the cam 708 serves to delay operation of the restore clutch until near the end of the setting clutch cycle, the reason for which will appear in a description of the division mechanism hereinafter.

As the setting clutch continues to rotate, the accumulator is lowered and the shaft 600 is rocked counter-clockwise by the arm 599 (see also Figure 11) keyed thereto. Arm 722, also keyed to the shaft 600 is thus lowered, and since the M-shaped member 703 is held by the latch member 701, the link unit 723 is lengthened and spring 714 is compressed.

The parts remain so positioned until the main clutch dog 395 is permitted to reseat in the notches of the main clutch, whereupon the extension 408 thereof strikes the ear 710 on the latch member 701, rocking it clockwise and removing its lug 718 from the notch 719 of the member 703. The spring 714 is then permitted to expand, shortening the link unit 723 and rocking the member 703 counter-clockwise to carry the left leg thereof, as viewed in Figure 15, down against the leftwardly extending arm of the bell crank 405 to move the nose 702 away from the restore clutch and cause engagement thereof.

Operation of the restore clutch, thus initiated, enables the accumulator to rise, as previously described, rocking arm 722 clockwise by virtue of its connection therewith. This movement of the arm 722 is transmitted directly to the link unit 723 to rock the member 703 clockwise and to compress the spring 705 until the nose 702 of the restore clutch dog 405 reenters the aperture of the housing to disengage the clutch, whereby the restore control mechanism is brought to rest in the position shown in Figure 15.

*Division*

The machine of the present invention includes means for automatically performing problems in division. In such operations, the dividend is set up in the accumulator in the usual well known manner, the divisor is set up on the keyboard, and the automatic division key is depressed. The machine thereupon carries out automatically the operation of dividing the divisor into the dividend and registering the quotient in a counter 1800 (Figure 1) carried by the carriage 250. Mechanism is provided for automatically comparing the dividend and divisor and for utilizing the indication of the relative magnitude thus obtained to select the proper ensuing operation, such as automatically shifting the carriage one step to the left, when the effective dividend is reduced to a value below that of the divisor.

*Keyboard controlled mechanism*

The mechanism for forming a mechanical representation of a divisor value set in the keyboard comprises sensing levers 900 (Figures 24, 25, 26, and 27) carrying sensing shelves 901 and pivotally supported at 902 on carrier members 903 which are adjustable so as to permit the pivots 902 to be raised and lowered for the purpose of differentially positioning the pivots in accordance with values set on the keyboard.

The pivots 902 of levers 900 are adapted to be proportionally positioned under control of the manually set selection mechanism of a plurality of keyboard orders. Except in the orders which are blocked out of operation as hereinafter described, each pivot 902 is positioned so as to form a mechanical representation of the value set up in its related order plus one-tenth of the value set up in the next order to the right thereof. It is unnecessary to transmit partial increments to each pivot 902 from keyboard orders below the next adjacent order, and no provision for it is therefore disclosed.

Each sensing lever 900, being pivotally supported by a pin 902 on its above mentioned respective carrier member 903, is urged to rock counter-clockwise by a torsion spring 904 tensioned between the member 903 and the sensing lever 900. The lever 900 includes a stop lug 905 (see Figure 22) which overlies and engages the member 903 (Figure 25) to limit the movement of the lever 900, and a blocking tail 906 is also provided which may be positioned to permit a division control bail 907 to rock in a clockwise direction and prevent further actuation, or to block the bail 907 from rocking and thereby cause the machine operation to continue, as will presently appear.

The carrier members 903 are pivotally supported in each order between adjacent brace plates 142, as appears in Figure 27, and each includes a bridge 913. Upon an extension 914 of each bridge 913 is fixed a sleeve 915 having a pin 916 slidably positioned therein, and also enclosing a spring 917 adapted to push the pin to the left to engage a head on the pin with the end of the sleeve to limit the travel of the pin. The pin of each order extends through a hole in each brace plate and into a hole in the member 903 of the next higher order to pivotally support both the member 903, upon which it is carried, and the corresponding member in the next higher order.

A spring 920 (Figures 23, 24, and 25) respective to each sensing assembly including each member 903 and 900 is tensioned between a stationary shaft 912 and a pin on the member 903 to urge each member 903 clockwise about the pivot pins 916.

Each supporting member 903 may be rocked counter-clockwise about the pivot pin 916 by a balancing lever 908 pivoted on the member 903 at 909 and capable of a limited rocking movement relative thereto. Rocking movement is imparted to the member 903 through the balancing lever 908 by both the selection segment 132 located in the same order and the selection segment in the next lower order in such a manner as to position the pivot pin 902 of the associated sensing lever 900 at a height commensurate with the value of the depressed key 100 in the same order plus one-tenth of the value of the key in the next lower order if such has been depressed. The following mechanism is provided for this purpose.

The lever 908 has a pin 910 thereon overlying a cam 911 pivotally mounted on the shaft 912. The cam 911 is rocked by a pin 924 which extends in a cam slot formed in the cam and which is fixed to a lever 922 rockable by the selection segment 132 in the same order through a sleeve 921 (Figures 23 and 24), to which both the segment 132 and the lever 924 is fixed. A spacer stud 923 also extends between the selection segment and the lever 922 in the same order to form a rigid unit.

It will be recalled that the selection segment 132 is rocked by depression of the keys in the aligned order of the keyboard and that the amount of its rocking movement is determined by the value of the key depressed. Therefore, the cam 911 is also rocked an amount depending upon the value of the key depressed, and its cam edge is stepped, as illustrated in Figures 24 and 25, to control rocking movement of the balance lever 908 through its pin 910 which engages the periphery of the cam. The balance lever 908 underlies an extension 925 (Figures 23 and 24) of the selection segment 132 of the next lower order and, therefore, when the pin 910 of the lever 908 is rocked upward by the cam 911, the lever 908 fulcrums about the extension 925, rocking the member 903 along with it to elevate the pivot pin 902 for the associated sensing lever 900 through a degree depending upon the value of the depressed key in the aligned keyboard order.

The position of the extension 925 on each of the selection segments 132 with respect to the coextensive axes of the pivot pins 916 is such that a movement of the selection segment in any order will cause the balance lever 908 in the next higher order to fulcrum about the point of contact between the pin 910 thereof and the associated cam 911 to rock the member 903 of said next higher order an amount equal to one-tenth of the movement of the member 903 in the lower order in which the segment was moved. By this arrangement the pivot 902 of a lever 900 may be raised about the axes of the pivot pins 916 a number of increments corresponding to the setting of its associated selection segment 132, plus an additional fraction of an increment decimally proportionate to the setting of the adjacent lower order selection segment, this positioning of the pivots 902 of the sensing lever 900, in conjunction with cam means operable by the accumulating mechanism to rock the levers 900 about the pivots 902, controls the mechanism for arresting negative actuation during division, as will appear hereinafter.

To avoid undue loading of the key sections (since the keys move the selection segments 132 directly), it is not desirable to move the members 903, 908, and 900 by the depression of the keys, and since it is also necessary to keep the sensing shelves 901 out of range of possible interference with carriage elements, except during certain portions of the division operation, mechanism is provided for normally maintaining all of the levers 900 and 903 in the position illustrated in Figure 26 wherein they are held out of co-operative relationship with the cams 911 and for maintaining all of the sensing levers 900 lowered sufficiently to avoid the possibility of contact with any carriage parts if the carriage should be shifted at this time.

This is accomplished by mechanism including a plurality of levers 930 (Figures 24, 26, and 28) keyed for limited lost motion upon a shaft 931 and having fingers 932 adapted to cooperate with extensions 934 on the members 903. When the machine is not operating in division, and even in division, until the setting clutch operates, the fingers 932 are held in engagement with the extensions 934 to hold the members 903 rocked counter-clockwise about the pivot pins 916 in the position shown in Figure 26. This carries the pins 910 of levers 908 sufficiently clear of the cams 911 and rocks the members 903 so that the levers 900 pivoted thereon at 902 are pressed against a stationary cross rod 935 and rocked clockwise relative to the members 903, against the tension of springs 904, to lower the sensing shelves 901 sufficiently to prevent their contacting any carriage elements.

Throughout division, the sensing shelves 901 associated with all orders to the right of the highest order in which a divisor digit has been set up are blocked out of operation in the same manner as just described and are not permitted to rise sufficiently beyond the position in which they are held prior to the start of division, to bring them into cooperative relationship with members 1040 (Figures 5 and 24) to be described hereinafter. Connected by a separate sleeve 936 (Figures 26 and 28) with each of the members 930 is a member 937 having a shelf 938 adapted to cooperate with a lug 939 on the selection segment 132 of the adjacent higher order so that if the segment 132 of that order is advanced out of the zero position in which it is illustrated in Figure 26, the lug will overlie the shelf 938 and prevent a spring 996, tensioned between the member 937 and a frame stud, from rocking that member 937 counter-clockwise with the shaft 931 when the same is rocked during a setting clutch operation, the loose keyway permitting its retention in this manner.

If one lever 930 is so blocked, all those to the right of it will be similarly blocked even though zeros are set in the associated key sections, since the edge 940 on each lever 930 overlies the lever 937 to the right thereof, as is clearly shown in Figure 28, and all sleeves 936 to the right of a blocked sleeve are prevented from rocking in this manner.

From the foregoing it can be seen that when a divisor is set up on the keyboard and the shaft 931 is rocked counter-clockwise during the first setting clutch cycle in division, as will be described in detail hereinafter, the following positioning of parts described will be assumed.

1. The extension 925 of the selection segment on which the leftmost, or highest digit of the divisor is set up, will cause the pivot 902 of the sensing lever 900 associated with the next higher order to the left to be positioned a fraction of an increment above its zero position, said fraction depending upon the value of the digit set up in that keyboard order alone.

2. The pivots 902 of sensing levers 900 associated with all higher orders will each assume a zero position as indicated in Figure 24.

3. The cam 911 in the order of the previously mentioned selection segment of the highest order in which the digit is set up, and the extension 925 of the next lower order selection segment, will jointly cause the levers 908 and 903 to position the pivot 902 of the sensing lever 900 associated with said highest digit order at such a height as to mechanically represent the actual value of said highest digit and the next lower digit (assuming a digit has been set up in said next lower order) in their proper decimal relation of ten to one.

4. The sensing levers 900 of all orders below that order in which the highest digit of the divisor is set up will be blocked out of operation in a position illustrated in Figure 26.

*Division control bail*

When a divisor is set up in the keyboard and the shaft 931 is rocked counter-clockwise to enable certain of the sensing levers 900 to come into sensing position, the sensing lever 900 in the order containing the highest digit of the divisor and the sensing lever 900 in the next higher order effect control of a division control bail or gate 907 in accordance with the positioning thereof by the accumulator mechanism as will appear hereinafter. The gate 907 controls operation of the main clutch, as will appear presently, in order to arrest negative actuation when the effective dividend is reduced to a value below that of the divisor.

The gate 907 is mounted for swinging movement about pins 942 (Figures 20, 24, and 25) and extends across the machine with a finger 943 (Figure 22) extending rearwardly in each order between the parallel sides of the adjacent lever 903 and cooperating with the blocking tail 906 of the associated sensing lever 900.

Before the shaft 931 is rocked by the setting clutch, the gate 907 is held rocked counter-clockwise away from the blocking tails and out of a controlling position. For a short period after the shaft 931 is rocked, the gate is held before being released. Then, when the gate is released it is pulled clockwise by spring 944 (Figure 20), tensioned between a depending arm on the gate 907 and a frame stud, until it engages one of the blocking tails 906 or, if it does not engage any tail, rocks through to that position illustrated in Figure 24, wherein it is effective to stop or prevent main clutch operation. However, as long as the gate is in engagement with a single blocking tail 906 and is prevented thereby from assuming that position shown in Figure 24, the main clutch may operate. The fingers 943 are each slightly shorter than the finger in the next order to the left so that a blocking tail 906 in one order may release the gate, but the gate may only swing slightly before it engages the blocking tail in the next lower order. The tail in that order may then block the gate from swinging through and thus permit main clutch operation to continue.

The means whereby the division gate 907 controls operation of the main clutch will now be described. A link 2115 (Figure 20) is pivoted at its upper end to a lever 2116 mounted on one of the pivot pins 942 for the gate and is fixed for swinging movement with the gate by means of a pin and slot connection 2117. The lower end of the link 2115 is pivoted to a lever 2118 which rocks about a frame stud 2119. Upon clockwise movement of the gate 907 beyond its position illustrated in Figure 20, the link 2115 is lowered to rock the lever 2118 and, through a pin and slot connection with an arm 2120 fixed to a shaft 2121 imparts clockwise rocking movement to the shaft. Rocking of the shaft 2121 (see also Figure 10) is effective to rock a bell crank 2073 also fixed on this shaft. The bell crank 2073 has one arm thereon adapted to contact with a lug 2124 on the hereinbefore mentioned main clutch dog latch 632 to rock the latch counter-clockwise to release the main clutch dog 395, arresting operation of the main clutch. A second arm on the bell crank 2073 is adapted to contact with a lug 945 on the main clutch engaging interponent 603 and rock the interponent counter-clockwise about its pivot 604 on the cam follower lever 746 to prevent its extension 615 from engaging the hook 616 of the main clutch dog 395, thereby preventing engagement of the main clutch by the setting clutch unless the division control gate 907 is restrained by a blocking tail 906 during a setting clutch operation.

*Initiation of division operation*

Figure 16:
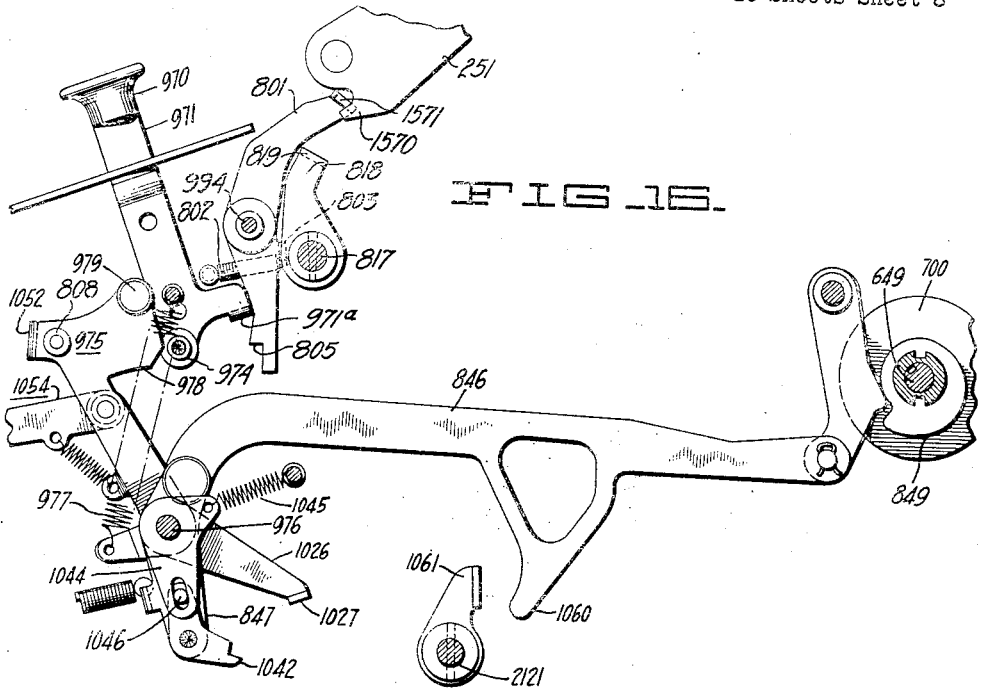
Figure 16 is a side elevational view illustrating part of the division control mechanism and the stop key mechanism.

The operation of the machine to perform a division calculation is initiated by depression of a division key 970 (Figures 1, 16, and 18). This key, when depressed, is latched down and releases a division control lever 975 to cause engagement of the setting clutch, conditioning of the main reverse unit 450 (Figures 7 and 14) to drive the actuator mechanism in a subtractive direction, and rocking of the shaft 931 (Figures 24, 26, and 28).

The division key 970 (Figures 16 and 18) is mounted on a key stem 971 supported for vertical movement by a parallel link arrangement comprising a link 972, and a lever 973, both pivoted to a frame plate (not shown). The key 970 is adapted to be latched in a depressed position by a latch 801 (Figure 16) pivotally supported on a shaft 994 and urged clockwise by a spring 802 tensioned between an ear 803 on the latch and a frame pin so as to cause a shoulder 805 on the lower end thereof to engage and latch a shelf 971a on the lower end of the division key stem when the key is depressed. The key is thereafter latched in depressed position until a stop key, to be described hereinafter, is depressed or until the leftmost position of the accumulator carriage is reached, at which time the latch will be rocked counter-clockwise to release the key.

The division control lever 975 is held in its illustrated position against the urge of its spring 977 by a latch 805a (Figure 19) fulcrumed at 806 and urged clockwise by a spring 807 tensioned between the latch and a frame pin (not shown) to engage its hooked end over a pin 808 on the division control lever 975. As the division key is depressed, the lever 973 is rocked clockwise and the tail thereof strikes a pin 809 on the latch 805a rocking the same upwardly to release the lever 975. The lever 973 is arranged to trip the latch 805a before the division key 970 reaches its lowermost position and, upon clockwise movement of the lever 975, an inclined forward edge 810 on the lever is adapted to engage a roller 974 on the division key stem and aid in further depressing the same.

The division control lever 975 causes initiation of operation of the setting clutch by virtue of a roller 979 mounted thereon and overlying the setting clutch control bar 503 (Figure 8) described hereinbefore in connection with the setting clutch. As the lever 975 is rocked clockwise by its spring 977, the roller 979 engages and depresses the bar 503 to start the setting clutch.

Means are provided for setting the main reverse unit 450 (Figures 7 and 14) upon depression of the division key, to effect negative operation of the actuator mechanism. A lever 986 (Figure 18) pivoted on a frame stud 987 has a camming portion overlying the roller 979 on the division control lever 975. As the lever 975 is rocked clockwise by its spring, the roller 979 rocks the lever 986 counter-clockwise causing an ear 988 thereon (see also Figure 14) to engage a projection 987 formed on the hereinbefore mentioned pendular lever 545 to rock the same in a clockwise direction to condition the reverse unit for negative operation.

Means are provided for rocking the shaft 931 (Figures 21 and 26) counter-clockwise for releasing the division sensing mechanism into operation upon depression of the division key. A member 990 (Figure 21) is keyed on the shaft 931 while another member 991 is loosely mounted on the same shaft for movement relative thereto. A latch lever 992 is pivotally mounted on the frame at 993 and is urged by a spring 994, tensioned between the latch and a frame pin, into engagement with ear 995 on the member 990 so as to prevent premature counter-clockwise movement of the shaft 931.

Figure 30:
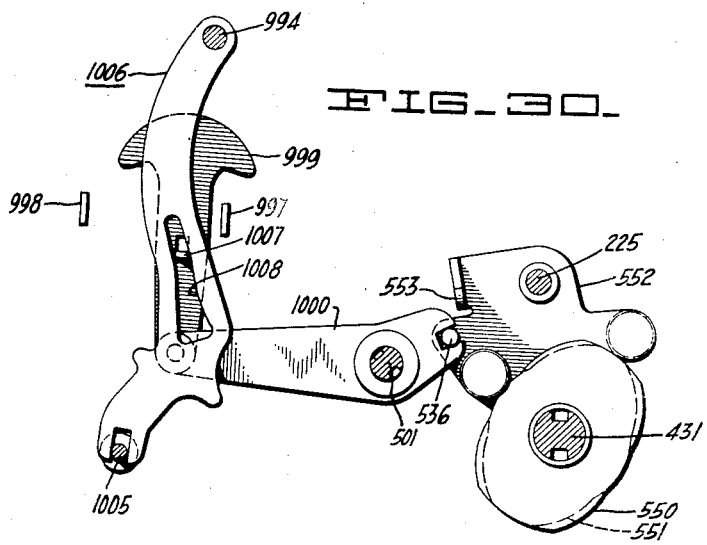
Figure 30 is a side elevational view of the parts for releasing and restoring the division sensing and stopping mechanism.

The members 990 and 991 have ears 997 and 998, respectively, situated on opposite sides of the shaft 931 for cooperation with a T shaped member 999 (see also Figure 30) pivotally supported on a rocking lever 1000 fulcrumed on the shaft 501 and provided with a slot embracing a pin 536 on the hereinbefore mentioned cam follower plate 552 which is rocked by the cams 550 and 551 during the setting clutch operation.

During a setting clutch operation, the lever 1000 is rocked to depress the T member 999 and, depending on the lateral position of the T member, it may engage selectively either the ear 997 on the member 990 or the extension 998 on the member 991.

The T member 999 is positioned by the division control lever 975, this lever carrying a pin 1005 (Figures 29 and 30) which extends into a slot in the lower end of a lever 1006 pivoted on the shaft 994. The T member 999 has a lug 1007 formed thereon which extends into a slot 1008 in the lever 1006 so as to be guided thereby. When the division lever 975 is rocked counter-clockwise to its illustrated position the T member 999 is positioned to overlie the ear 997, while when the division lever 975 is allowed to be rocked clockwise by its spring 977, to start a division operation, the T member 999 is positioned to overlie the ear 998. With the T member in this latter position, rotation of the cams 550 and 551 during the setting clutch cycle is effective to cause the T member to engage the ear 998 and rock the member 991 (Figure 21) counter-clockwise. Such movement of the member 991, which is freely rotatable on the shaft 931, first presses a lug 1010 on the member against the latch 992, rocking it away from the ear 995 on member 990, thereby freeing the shaft 931 for counter-clockwise movement under influence of the various springs 996 (Figures 24 and 26). The sensing mechanism including the levers 903 and 900 is thereupon released to take up those positions determined by the set up values as heretofore described.

Such counter-clockwise rotation of the shaft 931, enabling the sensing mechanism, is also effective to lock the carriage against lateral shifting movement (see Figure 21). The member 990, keyed on the shaft 931, is provided with an extension 1012 against which a spring 1013 pulls a lever 1014 pivoted on a shaft 1014a. This lever includes an extension 1015 which is formed to engage one of a series of equally spaced carriage plates 266 mounted on the carriage between the several orders thereof, and thereby retain the carriage from shifting movement until the extension 1012 is rerocked in a clockwise direction to cause the extension 1015 to assume the position illustrated in Figure 21.

The gate 907 (Figure 20) is also released upon rocking of shaft 931 by a lever 1016 fixedly keyed to the end of this shaft. When the shaft is rocked, a roller 1017 on lever 1016 rides up the curved edge of lever 2116 permitting clockwise movement of the gate 907 by spring 944, but to ensure that the several sensing shelves and their associated parts will have sufficient time within which to arrive at the positions dictated by the keyboard setting, the gate 907, although released upon counter-clockwise rocking of shaft 931, is temporarily held by other means until well toward the end of the setting clutch cycle and after the dipping of the accumulator.

Mounted upon a stud 1020 (Figure 20) on the control plate frame is a delay latch 1021 which is urged in a counter-clockwise direction by spring 1022 against the shaft 213 (see also Figures 2 and 18) which, it will be recalled, is supported by the rocking plates 214. When plates 214 are rocked in a counter-clockwise direction, upon initial operation of the setting clutch, as has been explained in connection with selection, the end of the delay latch 1021 is released by movement of the shaft 213 and is thereupon pulled in a counter-clockwise direction by spring 1022 to position its shelf 1023 in front of a shoulder 1024 of lever 2116. This prevents lever 2116 from rocking in a clockwise direction under the pull of the spring 944 and prevents the gate 907 from rocking into operation immediately upon rocking of shaft 931.

At the end of the setting clutch cycle, after the accumulator has been lowered by the dipping mechanism (Figure 11), and gears 271 and 189 are meshed, plates 214 are rocked clockwise and the shaft 213 returns to the position illustrated to engage the delay latch and force it clockwise to release the lever 2116 which is then pulled clockwise by spring 944 to cause the gate 907 to engage one of its fingers 943 with the blocking tail 906 in that order of the keyboard which is in control.

Toward the end of the setting clutch cycle (assuming that the gate 907 has been restrained by a blocking tail 906), the cam 747 (Figure 10) will rock lever 746, moving the extension 615 of interponent 603 into engagement with hook 616 on the main clutch dog 395 and rocking the said clutch dog to cause transmission of power through the main clutch to the actuator mechanism. The multicycle latch 632 then engages the clutch dog 395.

Operation of the actuator mechanism is thus initiated and continues until the blocking tails 906 are moved to release the gate 907, or until the special stop key, hereinafter described, is operated.

*Accumulator controlled mechanism and operation*

As is described in detail in the above mentioned Avery Patent 2,216,659, means (not shown herein) are provided for causing the accumulator dials 279 (Figure 2) to indicate by means of their rotational positions not only the digit value registered on themselves, but also a partial increment of an additional value that has been transmitted to each thereof from the lower orders by the entrained tens carry mechanism whenever the accumulator is dipped to mesh the gears 271 with the actuator gears 189 (Figures 2 and 11). That is, a dial in the first order of a value set up in the accumulator will register not only its own order value, but also the decimal value of all lower values set up in the accumulator.

As is also described in said patent, snail cams 281 (Figures 5 and 24) are suitably attached to respective ones of the accumulator dials 279 for controlling both the tens carry mechanism (not shown) and the division sensing mechanism. Each cam controls the position of an associated cam follower 315 pivoted on the rod 272 and provided with a roller 316 for engagement with the periphery of the cam, so that the position of the lever will be a representation of the value position of its associated dial 279. This structure is used to control the release of the gate at the proper stages in the division operation. That is, since the heights of the pivots 902 of the sensing levers 900 are regulated in accordance with the values of the associated value keys on which the divisor is set and are thereafter held at these heights throughout the negative actuation of the machine, release of the gate 907 by the controlling levers 900 so as to arrest operation of the actuator mechanism is effected by rocking the levers 900 about the pivots 902 under control of the snail cams 281 until the blocking tails 906 thereof pass above blocking relation with the fingers 943 of the gate 907.

Each cam follower 315 has pivoted thereon, for limited movement and for a purpose hereinafter described, a lever 1040 (Figures 5 and 24) the nose of which can engage the sensing shelf 901 of the sensing lever 900 in the aligned order of the keyboard if the pivot 902 therefor is standing in either a zero position, as indicated in Figure 24, or any position representing a value. Now, for example, with the first six orders from the left in the accumulator reading "000024," the noses of the first three levers 1040 will stand practically at a zero cam position, the tail of the fourth will stand at a position corresponding to a 0.24 position on the cam 281, the fifth at a position corresponding to a 2.4 cam position and the last at a 4.0 position. If the first five orders, from the left, on the keyboard are set "00008" and the shaft 931 is rocked, the pivots 902 of the first three sensing levers 900 will assume their lowermost zero positions as illustrated in Figure 24. The fourth order pivot will be positioned somewhat higher, at a .8 registration, while the fifth pivot will be positioned at an 8. registration. Any remaining sensing units in orders to the right will remain out of blocking relation with the gate, as previously set forth.

Assume that the carriage is in its rightmost position in which the second accumulator dial from the left is directly in line with the leftmost keyboard order; as the shaft 931 is rocked, the noses of the levers 1040 in the first four leftmost orders of the accumulator will practically stand at zero registration and the three rightmost ones of this group of four will be pressed against the aligned shelves 901 and will rock the sensing levers 900 clockwise so that the tails 906 thereof will be ineffective to block the gate 907, this condition being illustrated in Figure 24. However, in the fifth order (which will be termed the tens order) the tail of the compounding lever 1040 will stand at 2.4 value. Since this is a greater value than the .8 represented by the pivot 902 of the cooperating lever 900, the compounding lever 1040 will not press against the shelf 901 of this lever 900 and the shoulder 905 thereon will hold the lever in a position to cause its blocking tail 906 to restrain the gate 907 and the gears 189 will drive the accumulator gears 271 negatively to subtract "8" from "24."

During the first main clutch cycle of subtraction in the foregoing example, the remainder in the accumulator will be reduced from "24" to "16", the dial in the sixth order being driven from "4" through "0" to "6." Since its original 4. registration was in the first place less than the 8. registered on the aligned keyboard order, the original rocking of the shaft 931 pressed the shelf 901 of this order against the nose of aligned lever 1040 so that the associated blocking tail 906 was moved out of the path of the gate 907 leaving the gate restrained by the blocking tail of the next higher order alone. As this sixth order dial passes from "0" to "9" in this first cycle, the conformation of cam 281 permits the spring 904 to rock the associated lever 900 and raise its shelf 901 high enough to carry its locking tail 906 into the path of the gate 907, but this is only a temporary condition, for as the dial progresses to its final 6. position the cam 281 rocks the levers 315, 1040 and 900 to again raise the blocking tail out of the path of the gate. It should be noted, however, that the progressive shortening of the fingers 943 of gate 907, previously referred to, permits a blocking tail to the right of the one which is holding the gate, to drop into holding position at any time prior to the full release of the gate.

Although the position of the lever 315 in the fifth order of the accumulator is changed from 2.4 registration to a 1.6 registration during this first cycle, the pivot 902 of the lever 900 associated with the fourth order is positioned at .8 and hence, since this value is less than the 1.6 value, the lever 900 is not moved out of blocking relation with the gate. Therefore, a second subtraction cycle ensues.

During this second subtraction cycle, the position of the lever 315 in this fifth order of the accumulator is changed from 1.6 registration to a .8 registration equalling the .8 registration position of the associated sensing lever pivot 902, but still failing to rock the lever 900 to remove the blocking tail thereof from the path of the gate 907.

The lever 315 in the sixth order of the accumulator is moved, during this second subtraction cycle, from a 6. registration downward to a 0. registration, upward to a 9. registration, and back downward to an 8. registration. The upward movement permits its associated lever 900 to move into the path of a finger 943 of the gate 907 and a subsequent downward movement is insufficient to remove it from that position, so that at the close of the second cycle both the fifth and sixth order blocking tails 906 lie in the path of the gate 907 and another subtraction cycle ensues.

During the very first part of the third subtraction cycle, the downward movement of the sixth order lever 1040 will be sufficient to rock the associated lever 900 to remove its blocking tail 906 from the path of the gate 907, leaving the gate held by the fifth order blocking tail alone.

The value representing positions of the fifth order pivot 902 and lever 1040 were equal at the end of the second cycle, so that further lowering of the lever 1040 during the third cycle immediately begins to rock the lever 900. A small movement of this lever is sufficient to remove its blocking tail 906 from the path of the gate 907 which, thus released from restraint of all of the blocking tails, is pulled counter-clockwise by the spring 944, rocking shaft 2121 (Figure 20) clockwise, and thereby rocking the bell crank 2073 (Figure 10) to trip the multicycle latch 632 and thus arrest operation of the main clutch.

In order to insure proper movement of a "tens order" blocking tail 906; i. e., the blocking tail in the highest controlling order, the lever 1040 pivotally connected to each of the cam followers 315 (Figure 24) forms a compounding tip. When cooperating with a sensing shelf 901 in any registration from "2" to "9," the lever 1040 assumes a position above that shown in Figure 24, adapted to abut a stop 1045 on the lever 315. As the lever 315 reaches a position intermediate a "2" and "1" registration, however, the tail 1041 of the lever 1040 is pressed against a cross rod 268 carried by the accumulator supporting plates so that, upon further downward movement, the lever 1040 is rocked counter-clockwise about the lever 315 and the movement of its tip is increased about three times the movement of its pivotal connection to the lever 315. When functioning as a "tens order" control lever, the throw-off is always between one and zero and the compounding lever 1040, by magnifying the movement of the lever 315, insures the accurate functioning of this control.

As mentioned hereinbefore, rocking of the main clutch dog 395 (Figure 15) into engagement with one of the notches in the main clutch initiates operation of the restore clutch 700 which, during division, performs certain additional functions as follows.

During the restore clutch cycle in which the accumulator is raised as described hereinbefore to disengage the accumulator gears 271 (Figure 11) from the actuating gears 189, a cam 849 (Figure 16) coupled to the restore clutch 700 operates to move to the left a link 846 pivotally connected to a lever 847 fulcrumed on the shaft 976. Rocking movement of the lever 847 in a counter-clockwise direction by the link 846 is utilized to return the division control lever 975 counter-clockwise to its original illustrated position if it has been removed therefrom as during division. This is accomplished by means of a bell crank 1042 pivotally mounted on the lower end of the lever 847 and joined by means of a pin and slot connection 1046 to a lever 1044 also fulcrumed on the shaft 976 and yieldably held in its illustrated position by a spring 1045 tensioned between the bell crank 1044 and a frame pin. The spring 1045 acts to cause the bell crank 1044 to hold the crank 1042 in position to engage, with the notched end thereof, a lug 1027 during the first part of the movement of cam 849, the lug 1027 forming part of an extension 1026 of the lever 975. As the lever 975 is rocked back to its illustrated position against the urge of its spring 977 (Figures 16 and 29) the pin 1005 thereon is moved to the right rocking the lever 1006 (Figures 18 and 30) and, through the lug 1007, rocking the key member 999, so that the head of the latter is positioned over the lug 977 of member 990 (Figure 21) which is keyed on the shaft 931.

Upon being rocked to its leftmost position by the mechanism described above, the division control lever 975 is held by a latch member 1050 (Figure 18) pivotally supported on a frame pin 1050a and urged by a spring 1051, tensioned between the latch member and a frame pin, to engage an ear 1052 on the division control lever. The lever 975 is thereafter held latched in this position throughout the remainder of the division operation in that particular carriage order.

As the division control lever 975 is returned counter-clockwise to its illustrated position it effects setting of the reverse unit for a positive actuation if such is necessary, and engagement of the setting clutch for another cycle of operation. This is accomplished by a link 1054 (Figure 18) provided with a shoulder 1055 which, upon the first clockwise movement of the division lever by its actuating spring, is spring urged into engagement with an extension 1056 on a bell crank 1057 pivoted on the pin 806. As the lever 975 is returned counter-clockwise, the link 1054 rocks the bell crank 1057 against the action of a spring 1064, tensioned between the bell crank and the pin 1050a, whereby a lug 1058 thereon (see also Figure 8) presses down on the main operating bar 503 to institute a second setting clutch cycle of operation. The bell crank 1057 carries a roller 1059 which, upon clockwise rocking movement of the bell crank, engages the pendular control lever 545 (Figure 14) and rocks the same counter-clockwise to set the main reverse unit 450 for positive operation in the manner previously described.

Operation of the restore clutch 700, furthermore, returns the division control gate 907 to substantially the position illustrated in Figure 20 so that it may be relatched by the various blocking tails 906 of the sensing levers 900 if an overdraft has occurred in which the digits registered in the accumulator are now greater than those set up on the keyboard. For this purpose, the link 846 (Figure 16) is provided with an extension 1060 adapted, on leftward movement of the link, to rock an arm 1061 pinned on the shaft 2121 to which is also pinned the arm 2120 (Figure 20), thereby causing the members 2118 and 2115 to rock the gate 907 counter-clockwise.

At the end of the restore cycle, the cam 849 enables the link 846 to be spring returned toward the right, as viewed in Figure 16, and if the gate 907 is not held at this time by any of the blocking tails 906, it will be allowed to rock completely through its path of movement under the urge of its spring 944 and thus cause the bell crank 2073 (Figure 10) to engage the lug 945 and rock the member 603 downward with respect to the cam follower lever 746 so that, during the succeeding setting clutch cycle in which the follower 746 is rocked by the cam 747, the member 603 will not engage the main clutch dog 395 and main clutch operation will not occur. If, however, the gate 907 is blocked by a blocking tail 906, the bell crank 2073 will not become effective to rock the member 603 to an ineffective position and main clutch operation will therefore be instituted. It will thus be seen that main clutch operation at this time depends on whether or not an overdraft has occurred, for if an overdraft has taken place it is necessary that a positive actuation follow.

As the setting clutch proceeds through its second cycle, the reverse cams 550 and 551 (Figures 14 and 30) not only set the reverse unit 450 for positive operation, but also cause the cam follower 552 to rock the lever 1000 and lower the T member 999 which at this time engages the lug 997 to rock the shaft 931 (Figures 21 and 26) to restore the sensing levers 900 to the ineffective position in which they are shown in Figure 26, wherein they are maintained out of possible interference with the accumulator mechanism carried by the carriage 250. The shaft 931 is thereafter held in this position by the latch 992, while the member 990 moves its arm 1012 against the lever 1014 to shift the locking extension 1015 out of locking relation with the carriage.

If a corrective positive actuation is effected to correct for an overdrafted condition, it is necessary to limit the main clutch operation to a single cycle. Such corrective actuation takes place at a time when the division control lever 975 is in its leftmost position, as illustrated in Figure 16, and when moved to this position an ear 1027 on the extension 1026 of the division control lever moves a lever 1025 (Figure 9) counter-clockwise to the position illustrated enabling an arm 2050 pivoted at 2004 to be moved to the left by a spring 2052 tensioned between the arm and the frame so as to position an ear 2053 thereon directly over the upturned end of a lever 2051 pivoted to the frame at 2006. The lever 2051 overlies an ear 2049 of the multicyclic latch 632 (Figure 10) and thus, when restrained from movement by the ear 2053, prevents the latch 632 from moving into latching position with the main clutch dog 395 to cause a multicyclic operation. The main clutch dog therefore arrests operation of the main clutch after a single cycle of operation, and the second restore clutch operation proceeds in the usual manner.

If such a corrective cycle is not initiated, the restore clutch will be automatically engaged toward the end of the setting clutch cycle. Since in such an operation the main clutch dog 395 is not removed from the position in which it is shown in Figure 15, its extension 408 prevents any engagement of the lever 701 in the notch 719 of the M-shaped member 703 controlling operation of the restore clutch, and as the accumulator mechanism is dipped, rocking the shaft 600 clockwise, engagement of the restore clutch is prevented only by the bell crank 721 which engages the ear 720 on the M-shaped member 703. As the setting clutch cycle draws to a close, the cam 708 permits the bell crank to reseat from under the extension 720 and, since the latch 701 is already released by the extension 408 of the main clutch dog 395, the tensioned link unit 723 will cause the restore clutch to be engaged.

Operation of the restore clutch allows the accumulator mechanism to be raised as described hereinbefore and initiates an automatic carriage shifting operation, as will be described presently.

*Operation of the carriage shifting mechanism in division*

Means are included in the machine in which the present invention is disclosed for shifting the carriage 250. The control for this shift includes an automatic one step shift of the carriage to the left after a division operation in each carriage position until the last carriage position is entered. The construction and operation of this carriage shifting mechanism and controls therefor has been described in detail in the above mentioned Avery Patent 2,216,659, and a brief description of the controls therefor will be sufficient for an understanding of the present invention.

Movement of the carriage by the power driven shifting mechanism is immediately under control of a floating lever 1383 (Figure 29) having a pair of hooks formed on the rear end thereof adapted to selectively engage either of a pair of lugs 1217 and 1384 so as to draw the same to the left upon leftward movement of the lever 1383. The lug 1217 is connected to suitable mechanism (not shown) for causing a rightward carriage shift when this lug is moved to the left, as viewed in Figure 29, while the lug 1384 effects a leftward movement of the carriage when such lug is moved to the left.

In automatic division operations, and during the second cycle of operation of the restore clutch in each carriage position, counter-clockwise movement of one of the cam followers 570 (Figure 11) to allow the accumulator mechanism to be raised, carries a lug 1386 thereon against the notched end of a floating lever 1377 (Figures 11 and 29), shifting the same toward the left. The lever 1377 is pivotally supported at 1379 on a lever 1380 fulcrumed on the shaft 1376 and pivotally supporting the lever 1383 so as to transmit a leftward shift thereto to cause operation of the carriage shifting mechanism.

Figure 29:
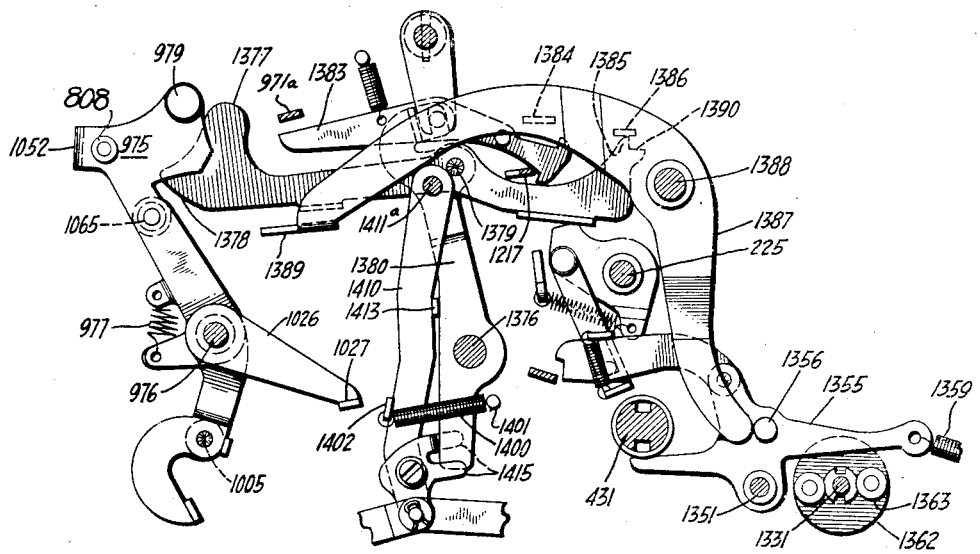
Figure 29 is a side elevational view, illustrating the relationship between the division control mechanism and the carriage shifting mechanism.

The first cycle of operation of the restore clutch in each carriage position does not initiate operation of the carriage shifting mechanism, since at that time, the division control lever 975 stands rocked clockwise from the position in which it is shown in Figure 29, and the roller 1065 thereon has lifted the left end of the link 1377, depressing its right end below the path of movement of the lug 1386. Later in the first restore clutch cycle, however, the lever 975 is rocked counter-clockwise to its illustrated position wherein it is latched, removing the roller 1065 from under the lever 1377 and permitting the same, which is weighted at its leftmost end, to rock counter-clockwise until the shoulder 1385 formed at the rear end thereof engages the under surface of the lug 1386. Subsequent rocking of the cam follower 570 to dip the accumulator mechanism during the second setting clutch cycle, preparatory to a possible correction cycle, then moves the lug 1386 to the right permitting the surface 1390 of the notch formed on the rearmost end of the lever 1377 to engage the latch 1386. During the following cycle of operation of the restore clutch, the lug 1386, being again rocked toward the left, will pick up shoulder 1385 and move the lever 1377 leftward to institute a carriage shifting operation.

In view of the fact that the shelf 971a (Figures 16 and 29) on the division key stem 971 directly overlies the leftmost end of the floating lever 1383, depression of the division key 970 rocks the lever 1383 to position the hooked end thereof behind the upper carriage shift control lug 1384, wherein it is held throughout the ensuing division operation, so that the carriage will be shifted toward the left.

Operation of the carriage shifting mechanism, thus initiated, is automatically limited to a single cycle to shift the carriage from one position to the next, and the division mechanism is automatically restarted at the end of that cycle. During the carriage shifting cycle, one of a pair of rollers 1363 (Figures 18 and 29) on a disc 1362 mounted on a shaft 1331, forming part of the carriage shift mechanism, engages a lever 1355 pivoted at 1351 to rock the same counter-clockwise against the action of its spring 1359. A pin 1356 on the lever engages and rocks a bell crank 1387 clockwise about a supporting shaft 1388 to cause a shelf 1389 thereon, which underlies the left hand portion of the lever 1377, to rock the lever 1377 from engagement with the lug 1386. The lever 1380 is then free to be retracted in a clockwise direction to release the carriage shift mechanism, by means of a centralizer lever 1410 pivotally supported at 1411a and urged to the right by a spring 1400 tensioned between an ear 1402 on the lever 1410 and a frame pin 1401 so as to engage the lever 1380 by means of a lug 1413 above the shaft 1376, and an attachment including legs 1415, one of which is bent to form an ear, engaging the lever 1380 below the shaft 1376.

Rocking of the bell crank 1387 is also effective to restart the division control mechanism. As will be noted in Figure 18, the shelf 1389 on the bell crank 1387 underlies the latch 1050 so that as the shelf 1389 is raised the latch 1050 is engaged thereby and rocked upwardly to release the division control lever 975, the same becoming effective just as the carriage reaches its new position.

Termination of division operation

The above mentioned repetitive tour of operations is repeated in each successive carriage position until the carriage reaches its leftmost position, when further operation of the carriage shifting mechanism is prevented and the machine is brought to rest.

As the carriage moves into its leftmost position, a camming projection 1570 (Figure 16) on the right hand carriage plate 251 contacts an inclined camming edge 1571 on the division key latch 801 and thus rocks the latch counter-clockwise against the action of its spring 802 to release the division key. However, by this time the bell crank 1387 (Figures 18 and 29) has been rocked by the shift mechanism, as above described, to cause the latch 1050 to trip the division control lever 975, enabling the under surface 978 thereof to be positioned above a roller 974 on the division key stem 971, preventing the same from being raised by its spring (not shown). Interlock means are provided, however, as shown in the above identified patent, to prevent sufficient clockwise movement of the lever 975 at this time to initiate setting clutch operation until the carriage is substantially in full position.

During the first restore clutch cycle while the carriage is in its leftmost position, the lever 975 is recocked to the left, allowing the division key to be spring pressed upwardly, and in doing so, the lever 973 (Figure 19) recedes from the pin 809 on the latch 805, allowing the spring 807 to rock the same into latching engagement with the pin 808 on the division lever. The latch 1050 is released at this time by the roller 974 on the division key stem 971, which roller strikes an extension on the latch 1050 as the division key rises. The machine is thus conditioned for subsequent operation of any character.

Interruption of division operation

Figure 17:
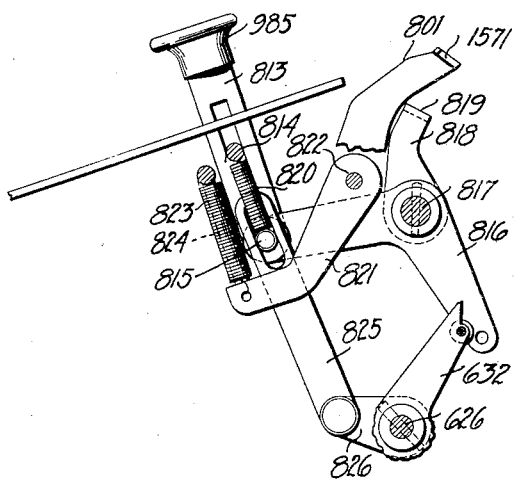
Figure 17 is a detail view illustrating part of the stop key mechanism.

A division operation may be terminated at the conclusion of operation in any carriage position by a partial depression of a stop key 985 (Figure 17), leaving the quotient digit in that order accurately registered, or it may be terminated at once by full depression of the same key, which may possibly leave an inaccurate quotient digit in the counter.

The stop key 985 is mounted on a key stem 813 having an elongated slot at the upper end thereof embracing a frame pin 814, and pivotally connected by a pin 815 to a bell crank 816 pinned on a rockable shaft 817 to which is also pinned an arm 818 (see also Figure 16). An ear 819 on the arm 818 underlies the latch 801 so that depression of the key 985 through approximately half of its full stroke, against the action of a light spring 820 tensioned between the pins 814 and 815, will be effective to rock the latch 801 counter-clockwise to release the division key 970, if the same has been latched in depressed position. This occurs in identically the same manner as when the camming projection 1570 on the carriage end plate 251 strikes the camming edge 1571 of the latch 801 when the carriage moves into its leftmost position.

Being released from its latch 801, the division key 970 is permitted to rise as soon as the division control lever 975 is recocked to its illustrated position shown in Figure 16. This occurs during the next restore clutch cycle and any corrective cycle, if such is necessary, is instituted by such recocking of the division lever due to the action of the link 1054 as has been described hereinbefore. The machine is then brought to rest, with the last quotient digit correctly registered.

Spring means are provided to yieldably limit the depression of the key 985 to approximately one-half of its full stroke so that the operator may easily determine the depth to which the key is to be depressed if he wishes to obtain the above mentioned "digit completion" operation. This means comprises an arm 821 pivoted at 822 to a frame stud and urged upwardly by a fairly heavy spring 823 tensioned between the arm and a frame pin. A rod 824 is inserted through the coils of the spring to limit the upward movement of the arm 821 to the position illustrated in Figure 17.

The arm 821 lies in the path of movement of the pin 815 on the stop key stem 813 and is so located that it is not engaged by the pin until the stop key has been depressed far enough to rock the latch 801 to release the division key. Therefore, the operator, using a normally light key touch to depress the stop key, would be limited to one-half of the full stroke of the key during which digit completion would occur before the machine would be arrested.

The pin 815 rides in an elongated slot 824 formed at the upper end of a link 825 pivoted to an arm 826 which is keyed to the shaft 626 to which the multicyclic main clutch control latch 632 is also keyed.

Upon depression of the key 985 beyond its half stroke position, wherein it engages the arm 821, the pin 815 strikes the lower end of the slot 824 and picks up the link 825 so as to rock the latch 632 and immediately arrest operation of the main clutch regardless of whether or not the quotient digit registered is correct. However, a positive cycle of actuation will ensue if such is necessary to correct for an overstroke at this time.

Keyboard lock

Means are provided for automatically locking the various value selection keys 100 against either depression or release from latched position during division, and for enabling the keys to be selectively locked in either raised or depressed position by the operator at any time.

Figure 6:
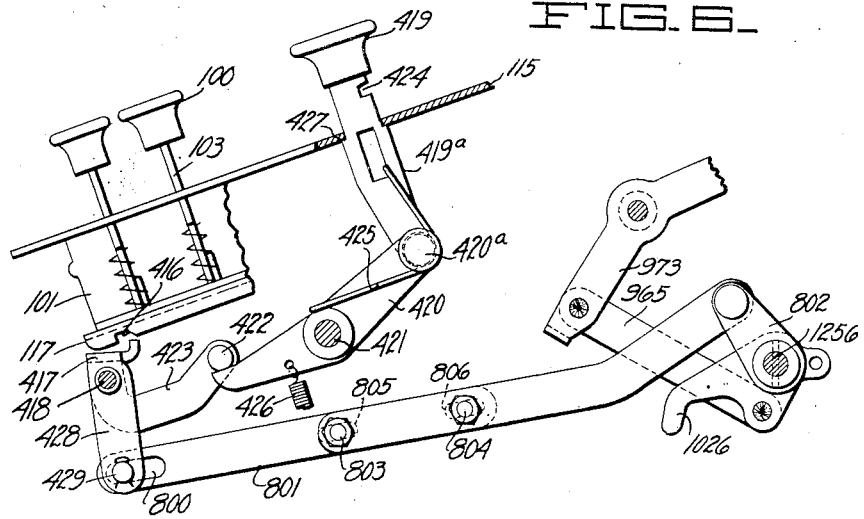
Figure 6 is a sectional view illustrating the keyboard lock mechanism.

Referring to Figures 2 and 6, the key latching slides 117, described hereinbefore in connection with the manually set selection mechanism, are provided with notches 416, aligned with each other when the slides are all in their leftmost illustrated positions. A locking bail 417 is pivotally supported at 418 and has a ledge formed thereon and adapted to be rocked into engagement with the leftmost edges of the notches 416 in the slides 117 so as to prevent lengthwise movement of the slides and, consequently, depression of the keys 100 or release thereof if the keys are already depressed.

For the purpose of selectively locking the keys against depression or release at any time, a locking key 419 (Figures 1 and 6) is provided on the left hand side of the keyboard, the key stem 419a of which is pivotally connected to a lever 420 fulcrumed to the frame at 421. The lever 420 underlies a pin 422 extending from an arm 423 which is mounted integrally with the locking bail 417 so that depression of the key 419 will rock the bail 417 counter-clockwise into locking engagement with the slides 117.

In order to lock the key 419 in depressed position, a notch 424 is formed on the upper end of the key stem 419a and is adapted to embrace the edge of a slot in the keyboard cover plate 115, through which the key stem 419a slides, when the key is depressed. A torsion spring 425 extending around the pivot pin 420a connecting the key stem 419a to the lever 420, urges the key stem toward the right so as to hold the notch 424 in a position embracing the edge of the plate 115 if the key has been depressed and rocked to the right to cause this latching. A tension spring 426, extending between a frame pin and the lever 420, normally holds the key 419 in its raised position in which shoulders 427 formed on the key stem 419a engage the under surface of the keyboard cover plate 115.

In order to automatically lock the keys 100 against depression or release during division operations, the following mechanism is provided. A depending arm 428 (Figure 6) is integrally connected to the latching bail 417 and is provided with a pin 429 slidable in an elongated slot 800 provided in a link 801, the other end of which is pivoted to an arm 802 pinned on a rockable shaft 1256. A lever 1026, also pinned to the shaft 1256, is connected to the hereinbefore mentioned division key supporting lever 973 (see also Figure 18) by a link 965. Therefore, when the division key 970 is depressed, the supporting lever 973 is rocked clockwise to likewise rock the shaft 1256 and thus draw the link 801 to the right, causing the leftmost end of the slot 800 therein to engage the pin 429 and rock the bail 417 into latching engagement with the slides 117. Throughout the duration of a division operation, and until the division key 970 is released, as hereinbefore described, the various value keys 100 will therefore be held against depression, or if they have already been depressed, they will be prevented from being released.

Without the above automatically operable key locking mechanism, the divisor set up in the keyboard could be inadvertently changed during a division performance either during a carriage shift or during actuation after the power selection mechanism is operated to receive the selection, and a wrong answer would obviously be registered. However, with the automatic key locking mechanism employed, it is impossible to inadvertently or otherwise change the keyboard set-up during division since the division key which directly controls the key locking mechanism is automatically retained in a depressed position throughout the entire division performance.

The link 801 is adjustable in length so as to obtain correct operation of the latching bail 417, being formed in two sections secured together by a pair of clamping screws 803 and 804 extending through holes in one section of the link and elongated slots 805 and 806, respectively, in the other section of the link.

I claim:

1. In a calculating machine having numeral wheels, settable actuating mechanism, and means for effecting operation of said numeral wheels by said actuating mechanism; the combination with a plurality of devices adapted to be set to maintain said means in operation, means for holding said devices in set position, and a depressible key; of means responsive to said key upon depression thereof to a predetermined depth for releasing one of said devices, means controlled by said numeral wheels for automatically releasing another of said devices, and means responsive to said key upon depression thereof beyond said predetermined depth for releasing said other device.

2. In a calculating machine having numeral wheels, settable actuating mechanism, and means for effecting operation of said numeral wheels by said actuating mechanism; the combination with a plurality of devices adapted to be set to maintain said means in operation, means for holding said devices in set position, and a depressible key; of yieldable means tending to prevent depression of said key beyond a predetermined depth, means responsive to said key upon depression thereof to said predetermined depth for releasing one of said devices, means controlled by said numeral wheels for automatically releasing another of said devices, and means responsive to said key upon depression thereof beyond said predetermined depth and against said yieldable means for releasing said other device.

3. In a calculating machine having numeral wheels, settable actuating mechanism, and means for effecting operation of said numeral wheels by said actuating mechanism; the combination with a plurality of devices adapted to be set to maintain said means in operation, means for holding said devices in set position, and a depressible key; of means responsive to said key upon depression thereof for releasing one of said devices, means controlled by said numeral wheels for automatically releasing another of said devices, and means including a lost motion connection operable by said key for releasing said other device.

4. In a calculating machine having numeral wheels, settable actuating mechanism, and means for effecting operation of said numeral wheels by said actuating mechanism; the combination with a plurality of devices adapted to be set to maintain said means in operation, means for holding said devices in set position, and a depressible key; of means responsive to said key upon depression thereof for releasing one of said devices, means controlled by said numeral wheels for automatically releasing another of said devices, means including a lost motion connection operable by said key, upon depression thereof, for releasing said other device, and yieldable means tending to prevent operation of said last mentioned means by said key.

5. In a calculating machine having numeral wheels, settable actuating mechanism, and means for effecting operation of said numeral wheels by said actuating mechanism including cyclic driving means for said actuating mechanism, the combination with means for controlling said machine to automatically divide an amount set up in said numeral wheels by an amount set up in said actuating mechanism and to register a plural digit quotient including means manually operable to initiate the operation; of division interrupting means comprising a manually movable member, yieldable means tending to prevent movement of said member beyond a predetermined position, means jointly controlled by said division control means and by said member, upon movement thereof to said predetermined position, for arresting operation of the machine after registration of the quotient digit being registered has been completed, and means controlled by said member, upon movement thereof beyond said predetermined position and against said yieldable means, for arresting operation of said actuating mechanism at the conclusion of the current cycle of operation of said driving mechanism.

6. In a calculating machine having numeral wheels, settable actuating mechanism, and means for effecting operation of said numeral wheels by said actuating mechanism including cyclic driving means for said actuating mechanism; the combination with means for controlling said machine to automatically divide an amount set up in said numeral wheels by an amount set up in said actuating mechanism and to register a plural digit quotient including means manually operable to initiate the operation, and a latch for maintaining the machine in operation; of division interrupting means comprising a manually movable member, means controlled by said numeral wheels for releasing said latch after registration of the quotient digit being registered has been completed, means controlled by said member, upon movement thereof to a predetermined position, for preventing relatching of said latch after release thereof by said last mentioned means, and means controlled by said member, upon movement thereof beyond said predetermined position, for releasing said latch immediately.

7. In a calculating machine having numeral wheels, settable actuating mechanism, and means for effecting operation of said numeral wheels by said actuating mechanism including cyclic driving means for said actuating mechanism; the combination with means for controlling said machine to automatically divide an amount set up in said numeral wheels by an amount set up in said actuating mechanism and to register a plural digit quotient including means manually operable to initiate operation, and a latch for maintaining the machine in operation; of division interrupting means comprising a depressible key, means controlled by said numeral wheels for releasing said latch after registration of the quotient digit being registered has been completed, means controlled by said key, upon depression thereof, for preventing relatching of said latch after release thereof by said last mentioned means and means including a lost motion connection operable by said key upon depression thereof for releasing said latch.

8. In a calculating machine having numeral wheels, settable actuating mechanism, and means for effecting operation of said numeral wheels by said actuating mechanism including cyclic driving means for said actuating mechanism; the combination with means for controlling said machine to automatically divide an amount set up in said numeral wheels by an amount set up in said actuating mechanism and to register a plural digit quotient including means manually operable to initiate the operation, and a latch for maintaining the machine in operation; of division interrupting means including a depressible key, a second latch, means controlled by said numeral wheels for releasing said first mentioned latch, means controlled by said second latch upon release thereof, for preventing relatching of said first mentioned latch after release thereof by said last mentioned means, means controlled by said key, upon depression thereof to a predetermined depth, for releasing said second latch, and means controlled by said key upon depression thereof beyond said predetermined depth for releasing said first mentioned latch.

9. In a motor driven calculating machine, the combination with registering mechanism, cyclically operable actuating mechanism therefor, means for controlling said actuating mechanism to divide an amount registered by said registering mechanism by an amount set into said actuating mechanism and registering a quotient digit by digit including a member operable to initiate such operation; and means for arresting machine operation; of a manually depressible key, means operable by said key upon partial depression thereof for controlling said arresting means to arrest machine operation upon registration of the instant quotient digit, and means operable by said key upon full depression thereof for controlling said arresting means to arrest machine operation as an incident to conclusion of the instant cycle of operation of said actuating mechanism.

WALTER E. MATHI.